US012701383B2

(12) United States Patent
Eronen et al.

(10) Patent No.: US 12,701,383 B2
(45) Date of Patent: Aug. 4, 2026

(54) RENDERING REVERBERATION FOR EXTERNAL SOURCES

(71) Applicant: Nokia Technologies Oy, Espoo (FI)

(72) Inventors: Antti Johannes Eronen, Tampere (FI); Sujeet Shyamsundar Mate, Tampere (FI); Jaakko Valdemar Hyry, Oulu (FI); Otto Viljami Harju, Tampere (FI)

(73) Assignee: Nokia Technologies Oy, Espoo (FI)

( * ) Notice: Subject to any disclaimer, the term of this patent is extended or adjusted under 35 U.S.C. 154(b) by 144 days.

(21) Appl. No.: 18/632,422

(22) Filed: Apr. 11, 2024

(65) Prior Publication Data

US 2024/0349007 A1 Oct. 17, 2024

Related U.S. Application Data

(60) Provisional application No. 63/496,441, filed on Apr. 17, 2023.

(51) Int. Cl.
*H04S 7/00* (2006.01)

(52) U.S. Cl.
CPC .................................... *H04S 7/305* (2013.01)

(58) Field of Classification Search
CPC .......... H04S 7/305; H04S 7/308; H04S 7/304; H04S 2400/11; H04S 2400/15; H04S 2420/03; H04S 7/00; G10K 15/08
See application file for complete search history.

(56) References Cited

U.S. PATENT DOCUMENTS

2021/0235214 A1* 7/2021 Raghuvanshi .......... H04S 7/308

FOREIGN PATENT DOCUMENTS

WO WO 2024126766 * 12/2023 ............... H04S 7/00
WO WO-2024/126766 A1 6/2024

OTHER PUBLICATIONS

Funkhouser, Thomas, et al., “Real-Time Acoustic Modeling for Distributed Virtual Environments”, Computer Graphics Siggraph 2000 Conference Proceedings, Jul. 1999, pp. 365-374.
WG6, MPEG Audio Coding “MPEG-I Immersive Audio CfP Supplemental Information, Recommendations and Clarificatoins, Version 1” ISO/IEC JTC1/SC29/WG6, N0083. Jul. 2021.
WG6, MPEG Audio Coding “MPEG-I Immersive Audio Encoder Input Format, Version 4” ISO/IEC JTCI/SC29/WG6,N0182. Jan. 2023.
Rocchesso, Davide “Maximally Diffusive Yet Efficient Feedback Delay Networks for Artificial Reverberation” IEEE Signal Processing Letters, vol. 4. No. 9. Sep. 1997.

* cited by examiner

*Primary Examiner* — Yosef K Laekemariam
(74) *Attorney, Agent, or Firm* — McCarter & English, LLP

(57) ABSTRACT

A method for generating reverberant audio signals, the method including: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

22 Claims, 15 Drawing Sheets y-axis → direct propagation value
x,z-axis → x,z of the acoustic environment
'x' → value modelled with a polynomial
'.' → calculated value

RENDERING REVERBERATION FOR EXTERNAL SOURCES

CROSS REFERENCE TO RELATED APPLICATION

This application claims priority under 35 USC 119(e) to U.S. Provisional Application No. 63/496,441, filed Apr. 17, 2023, which is hereby incorporated by reference in its entirety.

FIELD

The present application relates to apparatus and methods for rendering reverberation for external sources, but not exclusively for rendering reverberation for external sources in augmented reality and/or virtual reality apparatus.

BACKGROUND

Reverberation refers to the persistence of sound in a space after the actual sound source has stopped. Different spaces are characterized by different reverberation characteristics. For conveying spatial impression of an environment, reproducing reverberation perceptually accurately is important. Room acoustics are often modelled with individually synthesized early reflection portion and a statistical model for the diffuse late reverberation. FIG. 1*a* depicts an example of a synthesized room impulse response showing amplitude 101 over time 103 where the direct sound 105 is followed by discrete early reflections 107 which have a direction of arrival (DOA) and diffuse late reverberation 109 which can also have a direction of arrival or be synthesized without any specific direction of arrival.

In other words after the direct sound, the listener would hear directional early reflections. After some point, individual reflections can no longer be perceived but the listener hears diffuse, late reverberation. The starting time of the diffuse late reverberation can be referred to as the predelay.

The reverberation can be rendered using, e.g., a Feedback-Delay-Network (FDN) reverberator with a suitable tuning of delay line lengths. FDNs enable a controlling of the reverberation times (RT60) and the energies of different frequency bands individually. Thus, it can be used to render the reverberation based on the characteristics of the room. The reverberation times and the energies of the different frequencies are affected by the frequency-dependent absorption characteristics of the room.

Reverberation spectrum or level can be controlled using the diffuse-to-direct ratio, which describes the ratio of the energy (or level) of reverberant sound energy to the direct sound energy (or the total emitted energy of a sound source). It has been defined, for example within N0182 MPEG-I Immersive Audio Encoder Input Format, that an input to an encoder is provided as a diffuse-to-source energy ratio (DSR) value which indicates the ratio of the diffuse (reverberant) sound energy to the total emitted energy of a sound source. Another well-known measure is the RDR which refers to reverberant-to-direct ratio and which can be measured from an impulse response. The relation between the RDR and DSR values is, described in N0083_MPEG-1 Immersive Audio CfP Supplemental Information, Recommendations and Clarifications, Version 1, and can be represented as:

$$10*\log10(RDR) = 10*\log10(DSR) - 41 \text{ dB}.$$

Referring to FIG. 1, the RDR can be calculated by:

summing the squares of the sample values of the diffuse late reverberation portion 105;

summing the squares of the sample values of the direct sound portion 101; and calculating the ratio of these two sums to give the RDR.

The logarithmic RDR can be obtained as 10*log 10(RDR). Reverberation ratio can refer to the RDR or DSR or other suitable ratio between direct and diffuse/reverberant energy or signal level.

In a virtual environment for virtual reality (VR) or a real physical environment for augmented reality (AR) there can be several acoustic environments, each with their own reverberation parameters which can be different in different acoustic environments. This kind of environment can be rendered with multiple reverberators running in parallel, so that a reverberator instance is running in each acoustic environment. When the listener is moving in the environment, the current environment reverberation is rendered as an enveloping spatial sound surrounding the user, and the reverberation from nearby acoustic spaces is rendered via so called acoustic portals. The acoustic portal or window is a connection between two spaces.

An acoustic portal reproduces the reverberation from the nearby acoustic environment as a spatially extended sound source. In other words the acoustic portal can be seen as acting within an acoustic environment as a sound source with spread, and a reverberation from a nearby room is rendered through the portal. An example of which can be shown from FIG. 1*b* which shows an environment comprising two connected acoustic environments, AE 151 and $AE_c$ 153, which are connected or coupled via the portal 155. Furthermore is shown in the $AE_c$ 153 a sound source 159 and an area determining direct propagation value (DPV) 157. When rendering reverberation for the acoustic environment AE 151, sound source 159 outside the AE 151 can be considered as an external source (to the reverberator of AE 151). That is, it can contribute to the reverberation of the AE 151 through the portal so that a certain portion of the energy of the sound source 159 is taken into account in the input when generating the reverberation for AE 151. The portion of energy can be calculated based on the area determining the DPV 157. The benefit of inputting the sound source 159 into the reverberator of AE 151 is that not only the reverberation of the sound source 159 in the environment $AE_c$ 153 through the portal 155 is audible to a listener within AE 151 as an extended sound source at the portal 155, but the listener within AE 151 will also hear an immersive reverberation of sound source 159 being reverberated within AE 151.

SUMMARY

There is provided according to a first aspect a method for generating reverberant audio signals, the method comprising: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

The first acoustic environment may comprise at least one finite defined dimension range and at least one acoustic portal associated with the at least one finite defined dimension range.

Generating at least one parameter for the at least one position of the at least one audio source may comprise: obtaining at least one model parameter associated with the at least one position of the at least one audio source; and generating the at least one parameter based on the at least one model parameter, the at least one parameter related to energy propagation for the at least one audio source from the at least one position to the first acoustic environment.

The at least one parameter may be related to energy propagation for the at least one audio source from the at least one position to the first acoustic environment through the at least one acoustic portal.

The method may further comprise generating at least one further parameter related to a propagation delay for the at least one audio source from the at least one position to the first acoustic environment, wherein generating the reverberated audio signal associated with the at least one audio source may be further based on the further parameter applied to delay the associated audio signal.

Obtaining at least one model parameter may comprise obtaining a polynomial in at least two dimensions, and generating at least one parameter based on the at least one model parameter may comprise generating a direct propagation value representing transmission of energy from the at least one audio source through the at least one acoustic portal.

Generating a direct propagation value representing transmission of energy from the at least one audio source through the at least one acoustic portal may comprise evaluating the polynomial in at least two dimensions at a position for the at least one audio source to be rendered.

The method may further comprise obtaining a flag or indicator configured to identify whether the at least one audio source is a static or dynamic audio source, wherein generating at least one parameter may comprise recalculating the generation of the at least one parameter at determined update times for an identified dynamic audio source.

Generating the reverberated audio signal associated with the at least one audio source based on the at least one parameter related to energy propagation applied to the associated audio signal to adjust the level of the associated audio signal further may comprise applying a directivity filter based on an orientation of the audio source.

The at least one position outside of the first acoustic environment may be a center of a spatial extent of the at least one audio source.

The at least one position outside of the first acoustic environment may be at least two positions within a spatial extent of the at least one audio source, wherein generating the at least one parameter may comprise generating a weighted average of parameters associated with the at least two positions of the at least one audio source.

According to a second aspect there is provided an apparatus for assisting generating reverberant audio signals, the apparatus comprising at least one processor and at least one memory storing instructions that, when executed by the at least one processor, cause the system at least to perform: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

The first acoustic environment may comprise at least one finite defined dimension range and at least one acoustic portal associated with the at least one finite defined dimension range The apparatus caused to perform generating at least one parameter for the at least one position of the at least one audio source may be caused to perform: obtaining at least one model parameter associated with the at least one position of the at least one audio source; and generating the at least one parameter based on the at least one model parameter, the at least one parameter related to energy propagation for the at least one audio source from the at least one position to the first acoustic environment.

The at least one parameter may be related to energy propagation for the at least one audio source from the at least one position to the first acoustic environment through the at least one acoustic portal.

The apparatus may be further caused to perform generating at least one further parameter related to a propagation delay for the at least one audio source from the at least one position to the first acoustic environment, wherein the apparatus caused to perform generating the reverberated audio signal associated with the at least one audio source may be further caused to perform generating the reverberated audio signal based on the further parameter applied to delay the associated audio signal.

The apparatus caused to perform obtaining at least one model parameter may be further caused to perform obtaining a polynomial in at least two dimensions, and the apparatus caused to perform generating at least one parameter based on the at least one model parameter may be further caused to perform generating a direct propagation value representing transmission of energy from the at least one audio source through the at least one acoustic portal.

The apparatus caused to perform generating a direct propagation value representing transmission of energy from the at least one audio source through the at least one acoustic portal may be caused to perform evaluating the polynomial in at least two dimensions at a position for the at least one audio source to be rendered.

The apparatus may be further caused to obtain a flag or indicator configured to identify whether the at least one audio source is a static or dynamic audio source, wherein the apparatus caused to generate at least one parameter may be caused to perform recalculating the generation of the at least one parameter at determined update times for an identified dynamic audio source.

The apparatus caused to perform generating the reverberated audio signal associated with the at least one audio source based on the at least one parameter related to energy propagation applied to the associated audio signal to adjust the level of the associated audio signal may be further caused to perform applying a directivity filter based on an orientation of the audio source.

The at least one position outside of the first acoustic environment may be a center of a spatial extent of the at least one audio source.

The at least one position outside of the first acoustic environment may be at least two positions within a spatial extent of the at least one audio source, wherein the apparatus caused to perform generating the at least one parameter may be caused to perform generating a weighted average of parameters associated with the at least two positions of the at least one audio source.

According to a third aspect there is provided an apparatus for generating reverberant audio signals, the apparatus comprising means configured to: obtain at least one reverberation parameter associated with a first acoustic environment; obtain at least one audio source located at at least one position outside of the first acoustic environment, the at least one audio source having an associated audio signal; generate at least one parameter for the at least one position of the at least one audio source, related to energy propagation for the at least one audio source; and generate a reverberated audio signal associated with the at least one audio source based on the at least one parameter to adjust the level of the associated audio signal.

The first acoustic environment may comprise at least one finite defined dimension range and at least one acoustic portal associated with the at least one finite defined dimension range The means configured to generate at least one parameter for the at least one position of the at least one audio source may be configured to: obtain at least one model parameter associated with the at least one position of the at least one audio source; and generate the at least one parameter based on the at least one model parameter, the at least one parameter related to energy propagation for the at least one audio source from the at least one position to the first acoustic environment.

The at least one parameter may be related to energy propagation for the at least one audio source from the at least one position to the first acoustic environment through the at least one acoustic portal.

The means may be further configured to generate at least one further parameter related to a propagation delay for the at least one audio source from the at least one position to the first acoustic environment, wherein the means configured to generate the reverberated audio signal associated with the at least one audio source is further configured to generate the reverberated audio signal based on the further parameter applied to delay the associated audio signal.

The means configured to obtain at least one model parameter may be configured to obtain a polynomial in at least two dimensions, and the means configured to generate at least one parameter based on the at least one model parameter may be configured to generate a direct propagation value representing transmission of energy from the at least one audio source through the at least one acoustic portal.

The means configured to generate a direct propagation value representing transmission of energy from the at least one audio source through the at least one acoustic portal may be configured to evaluate the polynomial in at least two dimensions at a position for the at least one audio source to be rendered.

The means may be further configured to obtain a flag or indicator configured to identify whether the at least one audio source is a static or dynamic audio source, wherein the means configured to generate at least one parameter is configured to recalculate the generation of the at least one parameter at determined update times for an identified dynamic audio source.

The means configured to generate the reverberated audio signal associated with the at least one audio source based on the at least one parameter related to energy propagation applied to the associated audio signal to adjust the level of the associated audio signal is further configured to apply a directivity filter based on an orientation of the audio source.

The at least one position outside of the first acoustic environment may be a center of a spatial extent of the at least one audio source.

The at least one position outside of the first acoustic environment may be at least two positions within a spatial extent of the at least one audio source, wherein the means configured to generate the at least one parameter may be configured to generate a weighted average of parameters associated with the at least two positions of the at least one audio source.

According to a fourth aspect there is provided an apparatus for generating reverberant audio signals, the apparatus comprising: obtaining circuitry configured to obtain at least one reverberation parameter associated with a first acoustic environment; obtaining circuitry configured to obtain at least one audio source located at at least one position outside of the first acoustic environment, the at least one audio source having an associated audio signal; generating circuitry configured to generate at least one parameter for the at least one position of the at least one audio source, related to energy propagation for the at least one audio source; and generating circuitry configured to generate a reverberated audio signal associated with the at least one audio source based on the at least one parameter to adjust the level of the associated audio signal.

According to a fifth aspect there is provided a computer program comprising instructions [or a computer readable medium comprising instructions] for causing an apparatus, for generating reverberant audio signals, the apparatus caused to perform at least the following: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

According to a sixth aspect there is provided a non-transitory computer readable medium comprising program instructions for causing an apparatus, for generating reverberant audio signals, to perform at least the following: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

According to a seventh aspect there is provided an apparatus, for generating reverberant audio signals, comprising: means for obtaining at least one reverberation parameter associated with a first acoustic environment; means for obtaining at least one audio source located at at least one position outside of the first acoustic environment, the at least one audio source having an associated audio signal; means for generating at least one parameter for the at least one position of the at least one audio source, related to energy propagation for the at least one audio source; and means for generating a reverberated audio signal associated with the at least one audio source based on the at least one parameter to adjust the level of the associated audio signal.

According to an eighth aspect there is provided a computer readable medium comprising instructions for causing an apparatus, for generating reverberant audio signals, to perform at least the following: obtaining at least one reverberation parameter associated with a first acoustic environment; obtaining at least one audio source located at at least one position outside of the first acoustic environment, the at least one audio source having an associated audio signal; generating at least one parameter for the at least one position of the at least one audio source, related to energy propagation for the at least one audio source; and generating a reverberated audio signal associated with the at least one audio source based on the at least one parameter to adjust the level of the associated audio signal.

An apparatus comprising means for performing the actions of the method as described above.

An apparatus configured to perform the actions of the method as described above.

A computer program comprising instructions for causing a computer to perform the method as described above.

A computer program product stored on a medium may cause an apparatus to perform the method as described herein.

An electronic device may comprise apparatus as described herein.

A chipset may comprise apparatus as described herein.

Embodiments of the present application aim to address problems associated with the state of the art.

SUMMARY OF THE FIGURES

For a better understanding of the present application, reference will now be made by way of example to the accompanying drawings in which.

EMBODIMENTS OF THE APPLICATION

The following describes in further detail suitable apparatus and possible mechanisms for implementing reverberation in audio scenes with multiple acoustic environments and where two or more acoustic environments are acoustically coupled.

As discussed above several virtual (for VR) or physical (for AR) acoustic environments can be rendered with several digital reverberators running in parallel, each reproducing reverberation according to the characteristics of an acoustic environment.

Figure 2:
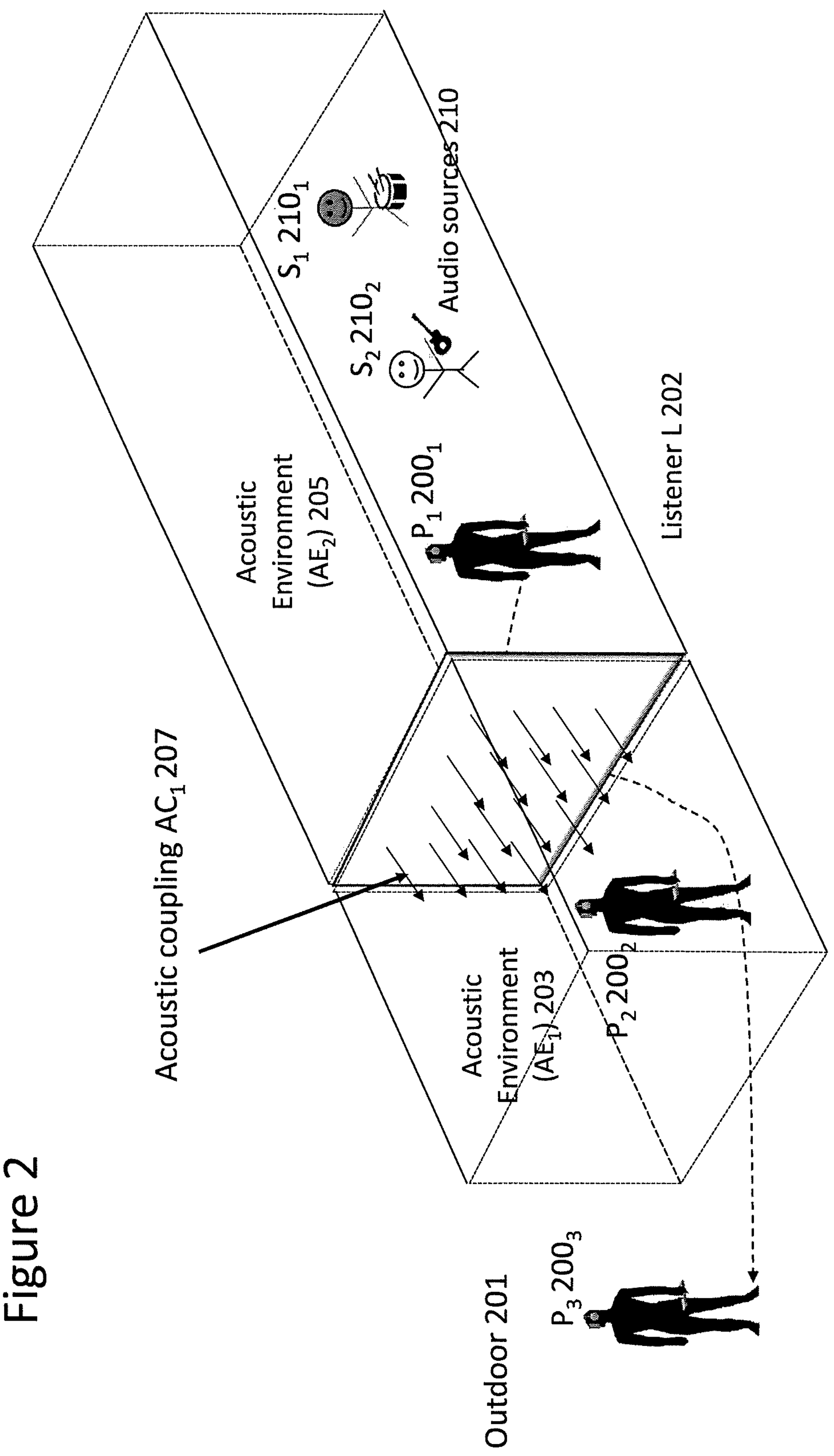
FIG. 2 shows an example environment comprising multiple acoustic environments suitable for demonstrating some embodiments.

The environments can furthermore provide inputs to each other via so called portals. For example, as shown with respect to the example environment shown in FIG. 2 there can be audio sources 210 (represented by $S_1$ 210$_1$ and $S_2$ 210$_2$) located in Acoustic Environment $AE_2$ 205. The $AE_2$ 205 can be coupled via the portal or acoustic coupling $AC_1$ 207 to the acoustic environment $AE_1$ 203. A listener L 202 can furthermore move through the environment such that the listener can be located at a first position $P_1$ 200$_1$ which is located within $AE_2$ 205, then move to a second position $P_2$ 200$_2$ which is located within $AE_1$ 203 and moving out of the environment into the outdoor 201 at a third position $P_3$ 200$_3$.

The rendering of the audio is such that the listener when at $P_1$ experiences reverberation based on $AE_2$ 205 but when passing through the acoustic opening or portal into another acoustic environment $AE_1$ 203 then the audio sources $S_1$ 210$_1$ and $S_2$ 210$_2$ should also be reverberated by the reverberator associated with the $AE_1$ 203.

If the audio sources from the neighboring environment $AE_1$ are not reverberated in $AE_2$ then the reverberated sound of $AE_2$ may sound unrealistic. Consider, for example, a gunshot being fired in a relatively dry room ($AE_1$) connected to highly reverberant corridor or room ($AE_2$). If the reverberation is implemented as indicated by current reference models, then the gunshot sound is not reverberated in the highly reverberant corridor even though from the physical perspective this would be clearly expected by the listener.

Figure 1A:
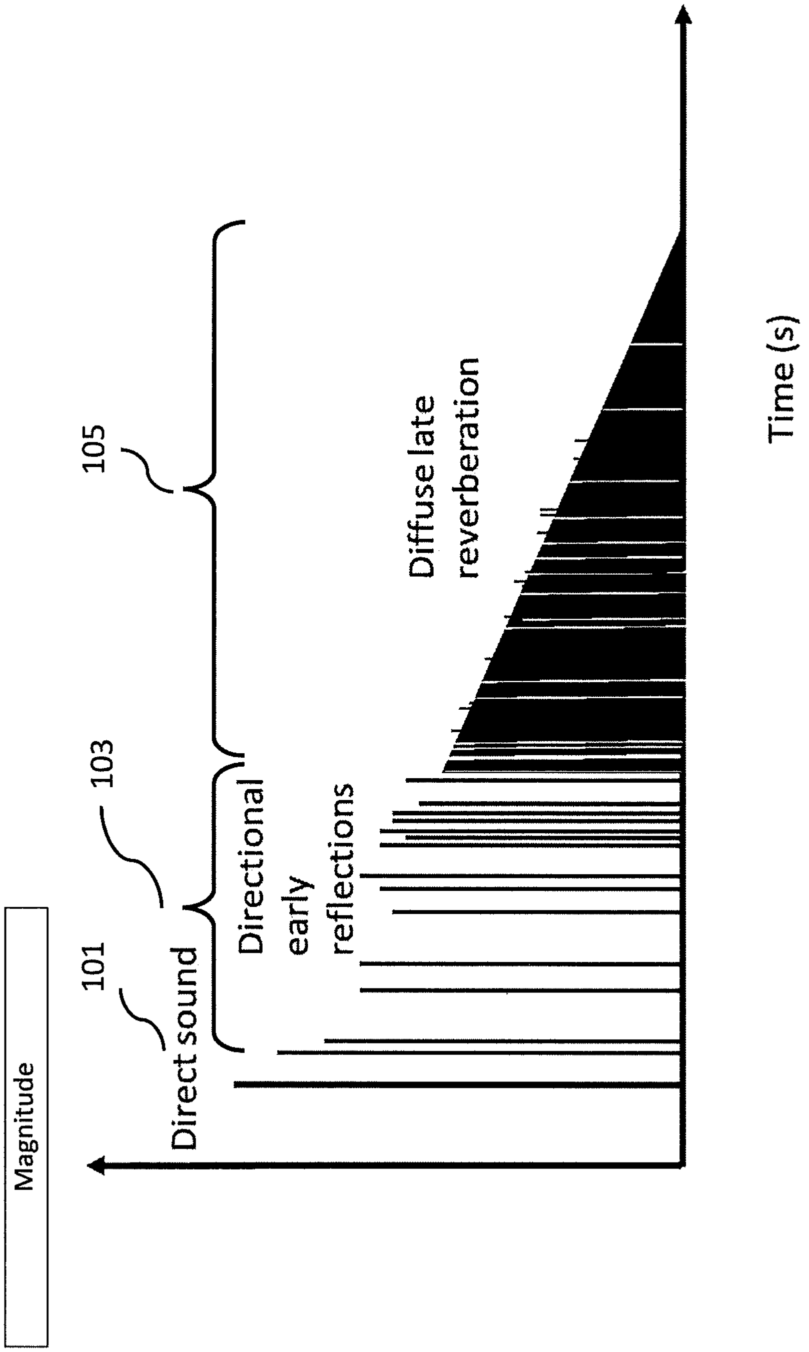
FIG. 1*a* shows a model of room acoustics and the room impulse response.
Figure 1B:
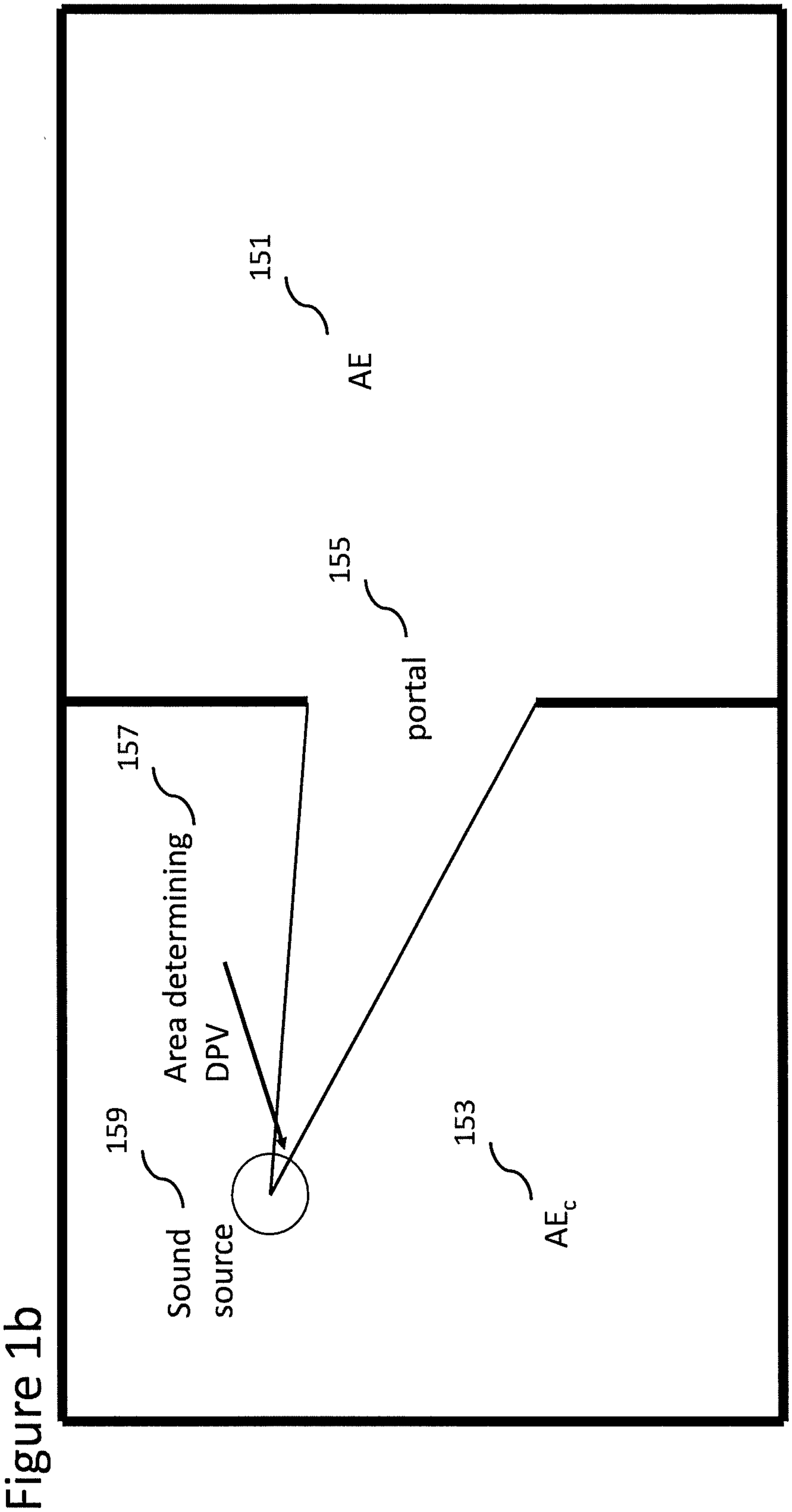
FIG. 1*b* shows an example environment comprising multiple acoustic environments.

There exist some solutions for reverberating sources in connected acoustic environments in a listener acoustic environment, which generally require geometric calculations during rendering to determine contributions of sound source energy into a reverberator through a portal opening. These can be computationally heavy, especially if such calculations need to be repeated for several (even hundreds or thousands) of sound sources. This can be shown in FIG. 1*b* where the sound waves traveling from the sound source towards the portal pass through the portal and excite the reverberation in the connected AE. The calculation can be based on calculating the ratio of the area to the area of a sphere with a radius of 1 m around the sound source. This ratio can be denoted as the Area determining DPV (direct propagation value) 157 as shown in FIG. 1*b*. This can lead to high computational complexity requirements within a device or apparatus and therefore suboptimal user experience as the device where the system is running consumes significant power (leading to short battery life in mobile devices).

An alternative to run-time calculations is determination or calculation of the necessary gain coefficients (or direct propagation values, DPV) on the encoder side. This has the benefit that computational complexity regarding geometric calculation and checks for line of sight can be offloaded to the encoder. However, encoder side processing has the limitation of generating a large bitstream size if the calculation is performed for all possible sound source positions and the DPV has to be written into the bitstream at all possible sound source.

Furthermore, these known solutions lack the possibility of adjusting the delay of arrival for sound sources from neighboring environments. If such adjustments are not implemented, then any reverberation created for a sound source in a neighboring environment can be presented too early compared to the propagated direct sound, or reverberation created for a sound source within the current environment. This can lead to reduced plausibility or realism of the VR or AR audio experience.

The concept which is expressed in the embodiments as described in further detail herein is one which relates to reproduction of (late) reverberation, where apparatus and methods are configured to enable rendering of reverberation for sound sources external to an acoustic environment with low computational complexity and bitstream size. In other words to offload any determinations and calculations to the encoder in order to reduce computational complexity on renderer, and have compact model parameters to carry the parameters for gain calculation in order to maintain a compact bitstream size.

In some embodiments this can be achieved by:

configuring a digital reverberator based on acoustic parameters associated with an acoustic environment having a finite or defined size;

obtaining a sound source at a position outside the acoustic environment;

obtaining model parameters associated with the position, the model parameters enabling the calculation of a gain value or coefficient related to energy propagation from the position through a portal to the acoustic environment;

rendering a reverberated signal using the reverberator and at least one input signal associated with the sound source while using the gain value or coefficient to adjust the level of the input signal when it is input to the reverberator.

In some embodiments, the model parameters are the coefficients of a polynomial in two dimensions which enable the calculation of a direct propagation value representing the passage of sound energy through an acoustic portal.

In some other embodiments, the model parameters relate to a three-dimensional region within an audio scene.

For example in some embodiments the polynomial is of the form $$f(x, y) = a_0 + a_1 x + a_2 x^2 + a_3 x^3 + b_0 + b_1 y + b_2 y^2 + b_3 y^3$$

and the polynomial is evaluated at the position, $\hat{x}$, $\hat{y}$ of the sound source to be rendered. The value of the polynomial $f(\hat{x}, \hat{y})$ or its square root $\sqrt{f(\hat{x},\hat{y})}$ is the gain value to be applied to the sound source when input to the reverberator.

In some embodiments, there is a flag indicating static sound sources for which the model evaluation does not need to be repeated but can be implemented only once at their position.

In some embodiments, there is a flag for dynamic objects indicating such sound sources which need to be recalculated at every update cycle.

In some embodiments, the polynomial coefficients are associated with regions in the audio scene where the value of the gain coefficient modelled with the polynomial has a unimodal distribution suitable for modelling with a polynomial.

In some other embodiments the parameters are the weights $\pi_k$, means $\mu_k$, and variances $\Sigma_k$ of a Gaussian mixture model (GMM). Such a model can be defined as $$N(\mu_k, \Sigma_k) = \sum_{k=1}^{K} \pi_k N(x \mid \mu_k, \Sigma_k)$$

where $N(\chi|\mu_k,\Sigma_k)$ evaluates a multivariate normal density with parameters $\mu_k$ and $\Sigma_k$ for an input vector x.

In some other embodiments different regions of a (multimodal) surface of gain coefficients (DPV values) are modelled with a Gaussian mixture model and the means of the mixture densities model the peaks in the surface.

In some other embodiments the number of Gaussians in the mixture K is set to be equal to the number of peaks in the surface of the DPV data.

In some embodiments, any other suitable approach is used to determine a model which determines the DPV based on the audio source position with acceptable accuracy while being represented by a compact set of parameters. For example, the derivation of DPV can be performed by a suitably trained neural network, where the neural network can be represented by a compact set of parameters.

In some further embodiments, the signal of an external sound source is fed into a predelay line having a length proportional to the distance of the sound source from the audio environment whose reverberation is rendered.

Furthermore in some embodiments, the orientation of the sound source is taken into account when applying a directivity filter to the samples in the predelay line.

In some embodiments, in case of a sound source with spatial extent (or size), the center of the spatial extent is defined as the sound source position. In another embodiment, in case of a sound source with spatial extent, the evaluation with the model is performed with two or more representative point sources with weights associated with each of the representative point source.

MPEG-I Audio Phase 2 will normatively standardize the bitstream and the renderer processing. There will also be an encoder reference implementation, but it can be modified later as long as the output bitstream follows the normative spec. This allows improving the codec quality also after the standard has been finalized with novel encoder implementations.

The concept as discussed in the following embodiments can be assigned to different parts of the MPEG-1 standard such as follows:

The normative bitstream shall contain the model parameter values corresponding to different portals and different regions of the audio space where sound source can locate and propagate to this portal. The bitstream shall also contain the necessary scene and acoustic (reverberation parameters).

The normative renderer shall decode the bitstream to obtain Scene and reverberation parameters and model parameters, initialize reverberators for rendering using the reverberator parameters, determine portal connection information between acoustic environments, determine model parameters associated with a portal and position outside an acoustic environment, evaluate a gain value to be applied to a sound source external to an acoustic environment using the model parameters and render reverberated signal using the reverberator while applying the gain value to the audio signal of the sound source when input to the reverberator.

Figure 3:
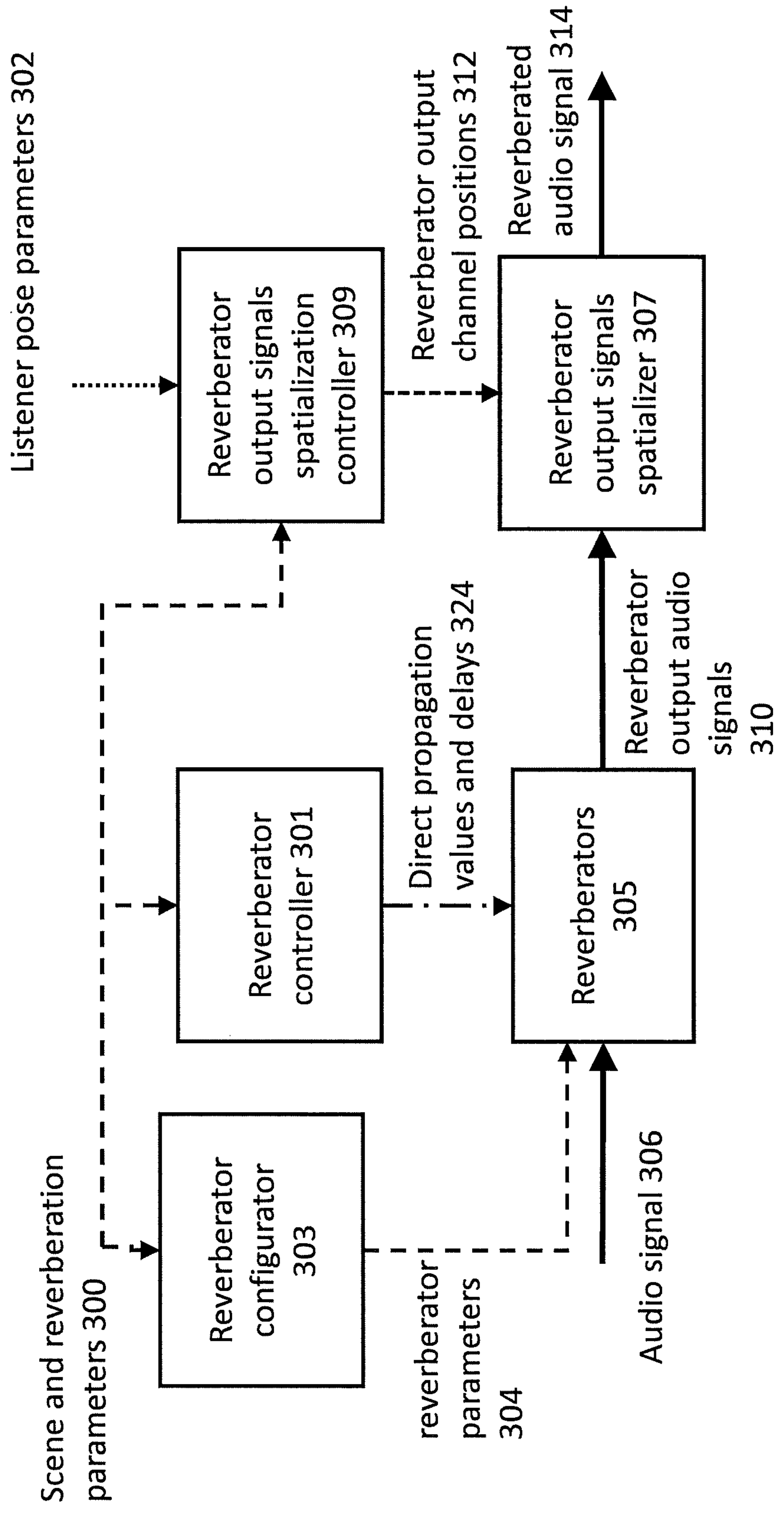
FIG. 3 shows schematically an example apparatus within which some embodiments may be implemented.

With respect to FIG. 3 is shown a schematic view of example apparatus suitable for implementing some embodiments. The example apparatus can be implemented within a renderer or playback apparatus.

In some embodiments the input to the system of apparatus comprises scene and reverberation parameters 300. The scene and reverberation parameters 300 in some embodiments can be obtained from a retrieved 6DoF rendering bitstream such as provided by a suitable bitstream. The scene and reverberation parameters 300 in some embodiments are in the form of enclosing room geometry and acoustic parameters (for example reverberation time RT60, reverberation ratio as DSR or RDR). The scene and reverberation parameters 300 in some embodiments can also comprise: the positions of audio elements (sound sources) in the environment; the positions of the enclosing room geometries (or Acoustic Environments) so that the method can determine in which acoustic environment the listener currently is based on the listener pose parameters 302; the positions and geometries of the portals (i.e. the acoustic couplings or openings in scene geometry) such that sound can pass between acoustic environments; and polynomial coefficients (or more generally model parameters) for calculating gain values for sources in connected acoustic environments (or elsewhere in the audio scene).

Additionally the input to the apparatus comprises an audio signal 306 which can be obtained from the retrieved audio data and which in some embodiments is provided by the suitable obtained bitstream.

The system furthermore is configured to obtain listener pose information 302. The listener pose information is based on the orientation and/or position of the listener or user of the playback apparatus.

As an output, the apparatus provides a reverberated audio signal 314 (e.g. binauralized with head-related-transfer-function (HRTF) filtering for reproduction to headphones, or panned with Vector-Base Amplitude Panning (VBAP) for reproduction to loudspeakers).

In some embodiments the apparatus comprises a reverberator configurator 303. The reverberator configurator 303 in some embodiments is configured to convert the reverberation parameters into reverberator parameters 304 which are parameters for the digital feedback delay network (FDN) reverberator (or more generally the reverberators 305)

The apparatus in some embodiments comprises a reverberator controller 301, which is configured to receive the scene and reverberation parameters 300 and produce direct propagation values and delays 324 for sound sources which are outside acoustic environments but feed their energy to the acoustic environments via portals. These direct propagation values and delays 324 information can change over time as portals open or close or sound sources move. In order to produce the direct propagation values and delays 324, the reverberator controller 301 is configured to employ the positions and geometries of portals, positions of sound sources, and polynomial coefficients obtained from the scene and reverberation parameters 300.

In some embodiments the apparatus comprises reverberators 305. The reverberators 305 are configured to receive the direct propagation values and delays 324, audio signal 306 $s_{in}(t)$ (where t is time) and reverberator parameters 304. The reverberators 305 in some embodiments are initialized and employed to reproduce reverberation according to the reverberator parameters 304. In some embodiments the each of the reverberators 305 is configured to reproduce the reverberation according to the characteristics (reverberation time and level) of an acoustic environment, where the corresponding reverberator parameters are derived from. In some embodiments, the reverberator parameters 304 are produced by an optimization or configuration routine on the reverberator controller 301 based on acoustic environment (reverberation) parameters.

In these embodiments the reverberators 305 are configured to reverberate the audio signal 306 based on the reverberator parameters 304 and direct propagation values and delays 324. The details of the reverberation processing are discussed in further details below.

The reverberator output audio signals $s_{rev,r}(j, t)$ 310 (where j is the output audio channel index and r the reverberator index) are output from the reverberators 305.

In some embodiments there are several reverberators, each of which produce several output audio signals.

In some embodiments the apparatus comprises a reverberator output signals spatializer 307 which is configured to receive the reverberator output audio signals 310 and produce a reverberated audio signal 314 suitable for reproduction via headphones or via loudspeakers. The reverberator output signals spatializer 307 is also configured to receive reverberator output channel positions 312 from a reverberator output signals spatialization controller 309. The reverberator output channel positions 312 in some embodiments is configured to indicate the Cartesian coordinates which are to be used when rendering each of the signals in $s_{rev,r}(j, t)$. In alternative embodiments other representations such as polar coordinates can be used.

The reverberator output signals spatializer 307 can be configured to render each reverberator into a desired output format such as binaural and then sum the signals to produce the output reverberated audio signal 314. For binaural reproduction the reverberator output signals spatializer 307 can be configured to use HRTF filtering to render the reverberator output audio signals 310 in their desired positions indicated by reverberator output channel positions 312.

In such a manner this reverberation in the reverberated audio signals 314 is based on the scene and reverberation parameters 300 as was desired and considers listener pose parameters 302.

Figure 4:
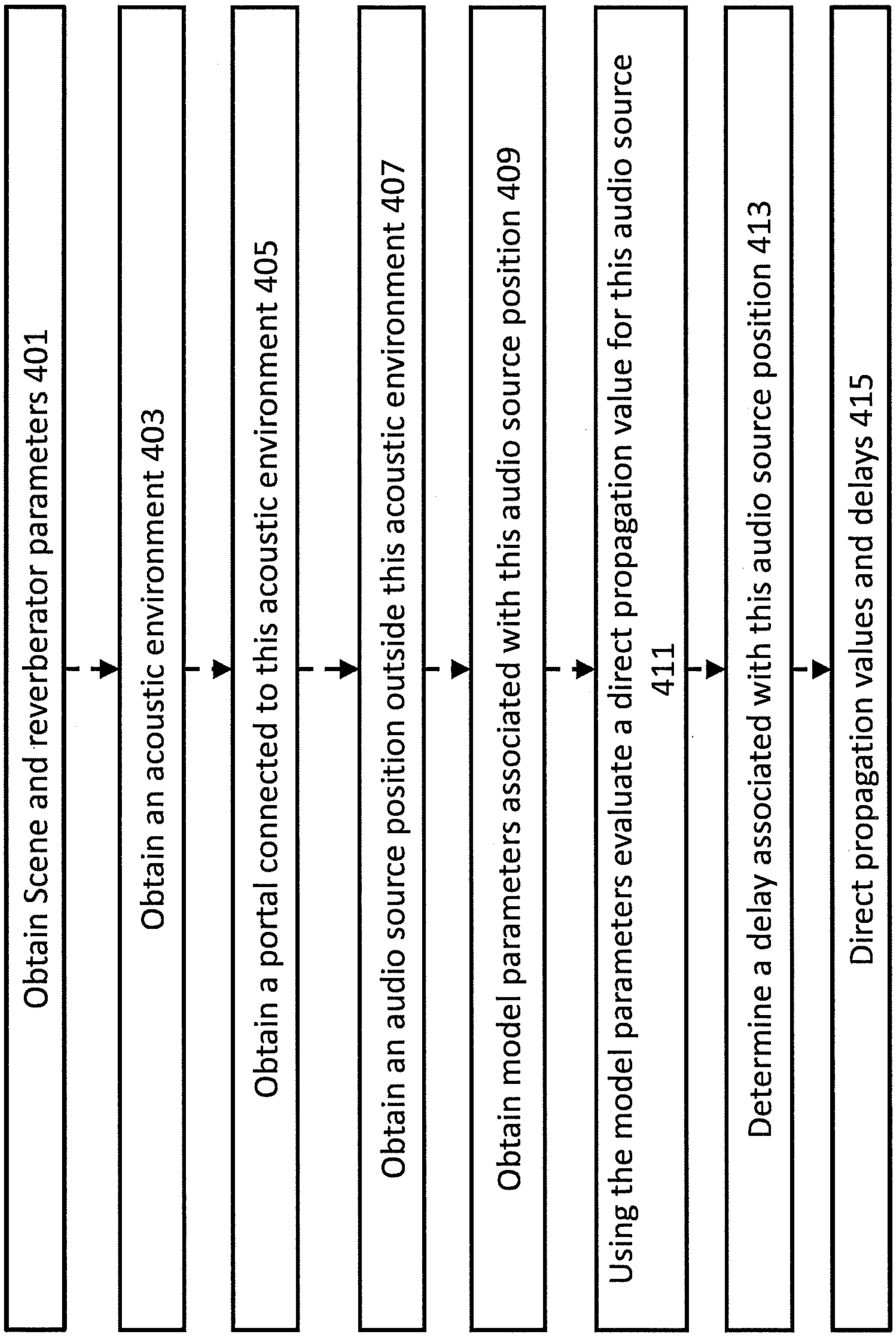
FIG. 4 shows a flow diagram of the operation of the example reverberator controller as shown in FIG. 3 in further detail according to some embodiments.

FIG. 4 shows a flow diagram showing the operations of the example reverberator controller 301 as shown in FIG. 3 according to some embodiments. As discussed above the reverberator controller 301 is configured to determine portal connections and based on the connection information provides gain coefficients (direct propagation value, DPV) and delay for the audio signal associated with a sound source. The processing is performed for all acoustic environments and DPV and delay is analyzed for all sound sources which can have a propagation path with a line of sight to the 'current' acoustic environment and therefore can be reverberated with this acoustic environment reverberator.

Thus for example the scene and reverberator parameters is obtained as shown in FIG. 4 by 401.

Additionally then the acoustic environment information or parameters are obtained as shown in FIG. 4 by 403.

Furthermore there is obtained a portal connected to the acoustic environment (as indicated by the acoustic environment information or parameters) as shown in FIG. 4 by 405.

Then there is obtained an audio source position outside this acoustic environment as shown in FIG. 4 by 407.

Based on these previous operations there is then determined or obtained model parameters for example a set of polynomial coefficients associated with this audio source position as shown by FIG. 4 by 409.

Then based on the determined or obtained model parameters a determination of obtaining of the DPV value for this sound source position and portal is implemented as shown by FIG. 4 by 411.

In some embodiments there are region of validity data associated with polynomial coefficients. The region of validity data can describe, for example, the corner coordinates of a rectangular region defining a validity region on the x, y plane for polynomial coefficients. There can be several such validity regions if there are several polynomials. If there are no polynomial coefficients for this sound source position (i.e. no validity region covers the current sound source position) then it means that from this position sound does not propagate via the portal. Alternatively, or in addition to, if the polynomial evaluates to zero then it can be determined that sound does not propagate from this position. If there are no validity regions then the polynomial coefficients can be considered to cover the entire scene.

In some embodiments, as discussed above the polynomial is in the form $$f(x, y) = a_0 + a_1 x + a_2 x^2 + a_3 x^3 + b_0 + b_1 y + b_2 y^2 + b_3 y^3$$

and the polynomial is evaluated at the position $\hat{x}$, $\hat{y}$ of the sound source to be rendered. The value of the polynomial f(x, y) or its square root is the DPV value to be applied to the sound source when input to the reverberator. The two axes mentioned here are example axis, any two axes corresponding to a plane could be considered. The embodiments therefore can employ one or more of multiple such polynomial models corresponding to different "heights" in the third plane. Hence, if (x, z) corresponds to the horizontal plane, then the equation can be represented as f(x,z) with coefficients of the polynomials corresponding to x and z axes of the plane. In some embodiments there can be employed different polynomials for different height or elevations corresponding to different Y values.

As shown in FIG. 4 by 413, a delay can be determined based on the distance of the sound source position to the acoustic environment. The delay can be, for example, proportional to the predelay of the acoustic environment where the sound source resides.

The direct propagation values and delays can then be output as shown in FIG. 4 by 415.

In some embodiments, there can be an additional determination of whether a portal connection is active.

An active portal connection can be determined as a connection where the portal is open; that is, there is no blocking acoustic element such as door in the portal. The exact method for determination about which portal connections are active is not the focus of this information. It can be determined using any suitable approach (e.g., explicit scene information about the state of the portal connection or determined with via shooting rays for detecting occlusion). For nonactive portal connections the DPV value can be set to zero.

Figure 5:
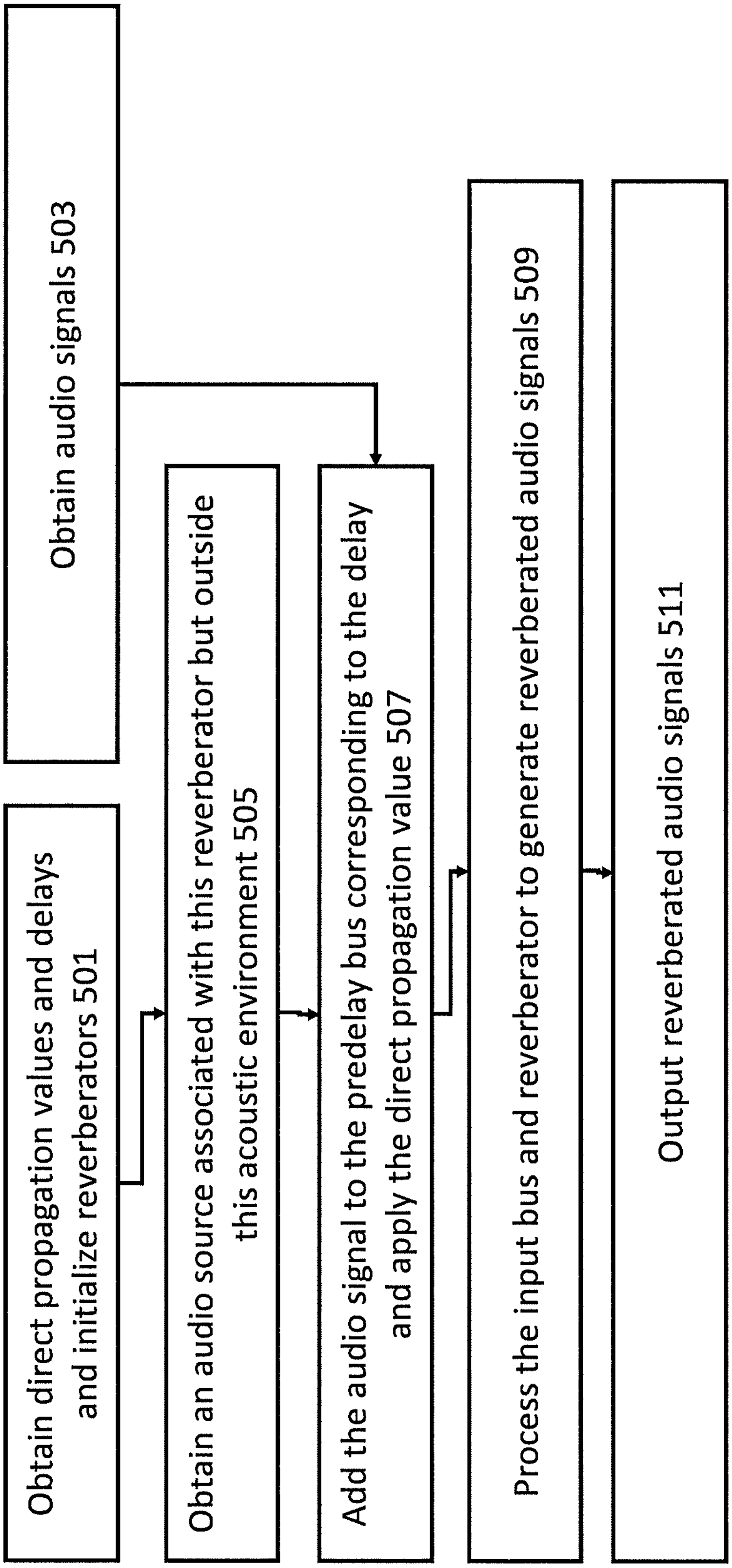
FIG. 5 shows a flow diagram of the operation of the example reverberator as shown in FIG. 3 in further detail according to some embodiments.
Figure 9:
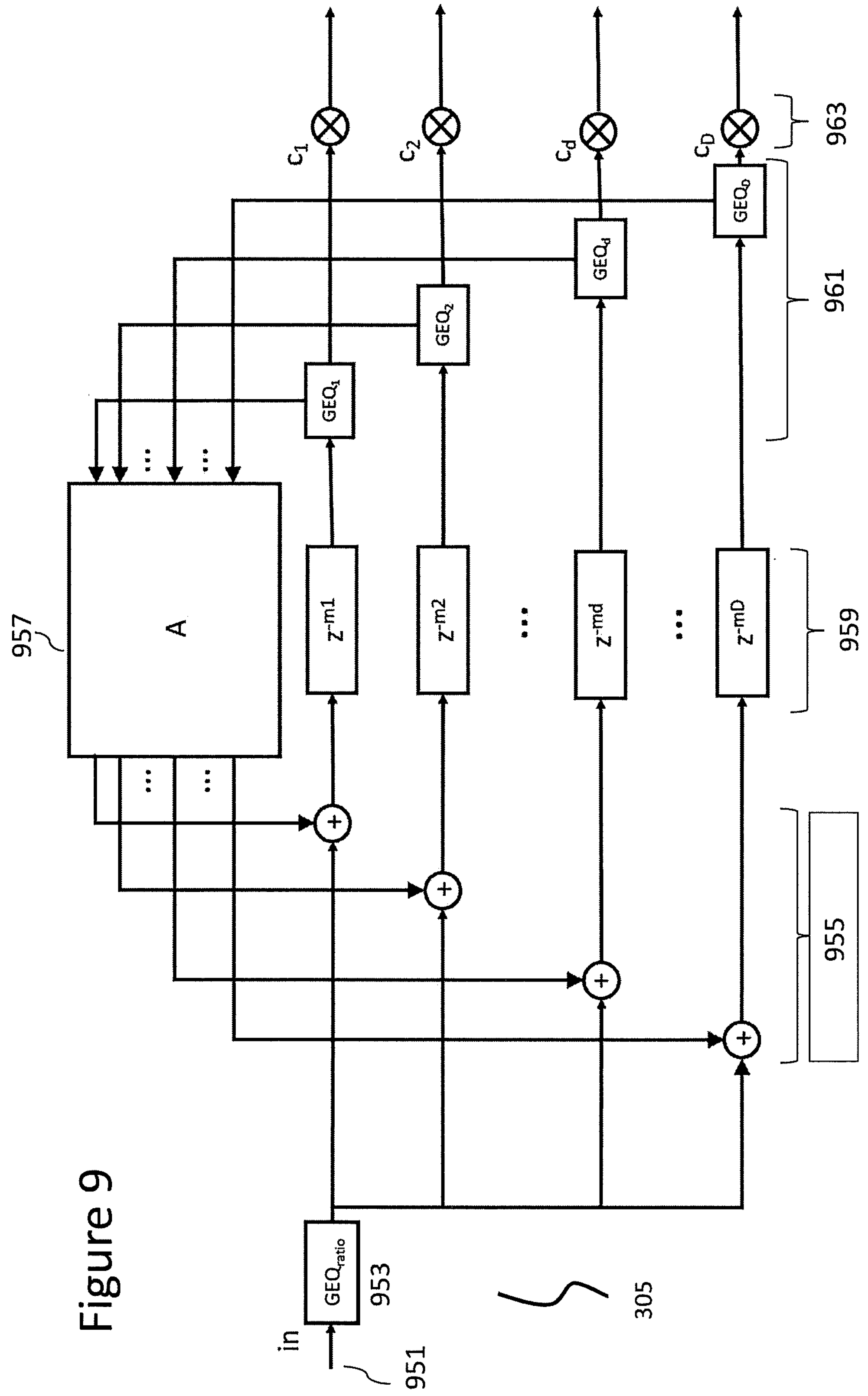
FIG. 9 shows schematically an example FDN reverberator as shown in FIG. 3 in further detail according to some embodiments.

FIG. 5 shows a flow diagram showing the operations of the example reverberators 305 as shown in FIG. 3 according to some embodiments. As described above the reverberators are configured to obtain or otherwise receive the direct propagation values and delays and initialize the reverberators as shown in FIG. 5 by 501. In some embodiments the reverberator parameters are parameters for an FDN reverberator as shown in FIG. 9 and described in further detail below.

The obtaining or determining of an audio source associated with this reverberator but outside this acoustic environment is shown in FIG. 5 by 505.

Furthermore is shown the obtaining of the audio signals as shown in FIG. by 503.

After the parameters for the FDN have been provided and the input audio signal obtained the audio signal can be input to the pre-delay bus corresponding to the delay and apply the direct propagation value as shown FIG. 5 by 507.

Following this delay is shown a processing of the input bus and the reverberator as shown in FIG. 5 by step 509. The output of the reverberator, the reverberated audio signal having desired reverberation characteristics is then output as shown in FIG. 5 by step 511.

Depending on determined direct propagation values and delays, the audio signal $s_{in}(t)$ of an audio source at a position x, y is taken as input to the reverberators. If the direct propagation value DPV(p, r, x, y) corresponding to portal p of reverberator r is nonzero, then $s_{in}(t)$ is provided as an input signal to reverberator r. When inputting $s_{in}(t)$ into the reverberator r, $s_{in}(t)$ is multiplied with the obtained gain sqrt(DPV(p, r, x, y)). Providing the $s_{in}(t)$ as an input to a reverberator which has a portal opening and a non-zero direct propagation value has the desired effect that $s_{in}(t)$ gets reverberated by the reverberator r even if the sound source was not located in the corresponding acoustic environment. Moreover, the gain of the source in the reverberator is scaled by the DPV, which depends on the path from the source to the portal opening.

For example, considering a virtual scene comprising a main hall (having a reverberator r) and an entrance room (having reverberator k). In this case it is desired that the sound sources of the entrance hall get also reverberated in the main room and vice versa.

Figure 6:
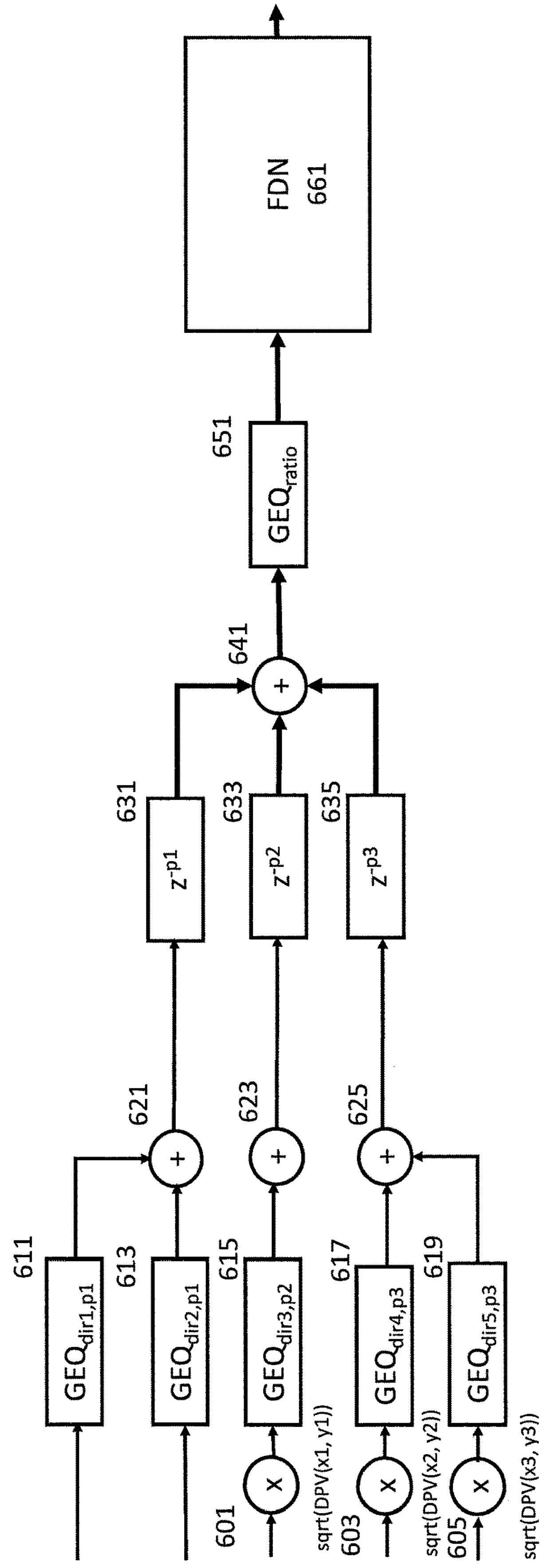
FIG. 6 shows schematically an example input signal bus coupled to a reverberator according to some embodiments.

FIG. 6 depicts a schematic view of an example system showing how input signals are fed to a reverberator. Each reverberator in the reverberators 305 can have its own input buses. Reverberators corresponding to connected AEs (AEs which have portals) have several input buses corresponding to different predelays (propagation paths). The predelay for items within an AE is unchanged (it is set accordingly to the input predelay). The predelay for an item within a connected acoustic environment $AE_c$ is predelay(AE)+max(floor (0.125*predelay($AE_c$)), minDelayLineLength($AE_c$)). Here, floor denotes a round to integer towards zero operation and minumumDelayLineLength denotes the minimum reverberator delay line length and max denotes maximum value. In some other embodiments a shorter predelay is approximately equal to the distance from the portal opening to the AE center. This is suitable, for example, if the external sound source does not reside within any acoustic environment.

Having extra predelay for external sound sources models approximately the additional time of flight that the sound needs to take before it arrives from the connected AE to the current AE reverberator. In some embodiments, the largest dimension is used to determine the predelay for audio sources from the neighboring acoustic environments sources contributing to the current acoustic environment.

In FIG. 6, input audio is mixed to input buses and there can be several input buses. There can be as many input buses as there are different propagation paths to the current acoustic environment. Input buses are summed before ratio filtering (equalization filtering). Sound source directivity filtering is also performed for signals within the input buses. The sources which have the same directivity filter patterns and predelays can be combined into the same bus.

Thus for example as shown in FIG. 6 there is an input bus path (p1) for sources which have directivity pattern dir1 and predelay p1, directivity pattern dir2 and predelay p1, the path comprising a $GEQ_{dir1,p1}$ 611 which is summed with the output of $GEQ_{dir2,p1}$ 613 within a combiner 621 and then a first delay applied by delay (with delay $z^{-p1}$) 631.

There is also shown in FIG. 6 a second input bus path (p2) for a source outside of the environment for sources with directivity pattern dir3 and predelay p2 which comprises a DPV filter 601 sqrt(DPV(x1, y1)), a $GEQ_{dir3,p2}$ 611 and then a second delay applied by delay (with delay $z^{-p2}$) 633.

A third input bus path (p3) for a further source outside of the environment for sources directivity pattern dir4 and predelay p3 and directivity pattern dir5 and predelay p3 which comprises a pair of DPV filters 603 sqrt(DPV(x2, y2)) and 605 sqrt(DPV(x3, y3)), a pair of $GEQ_{dir4,p3}$ 617 and $GEQ_{dir5,p3}$ 619 which receive the output of the DPV filters respectively and the outputs are combined by combiner 625 before a third delay applied by delay (with delay $z^{-p3}$) 635.

Each of the paths can then be combined by combiner 641 and a ratio filter applied $GEQ_{ratio}$ 651 before the output is passed to the FDN reverberator 661. In other words the outputs from each path are ratio filtered with the $GEQ_{ratio}$ filter 651. The FDN reverberator 661 processing is applied to the filtered and summed input signal. The resulting reverberator output signals $s_{rev,r}(j, t)$ (where j is the output audio channel index and r the reverberator index) are the output of the reverberators.

Directivity filtering can in some embodiments dynamically take into account changing sound source orientation during rendering. The directivity filtering can take into account the changes caused by integrating over the sector Area determining DPV such as shown in FIG. 1*b*. That is, the directivity pattern filter can at least in part depend on the integrated directivity pattern over the area marked as Area determining DPV in FIG. 1*b*. The directivity filter can be designed by using the response obtained by integrating over the directivity pattern as a target response. That is, directivity data can consist of gains $g_{dir}(i,k)$ for directions θ(i), θ(i) at frequencies k. Integration of the directivity data can be performed over such directions θ(m), θ(m) which are within the Area determining DPV. The ratio of this integration over the integration over all directions θ(i), θ(i) can be taken as the target response for the filter design of the directivity filter.

Figure 7:
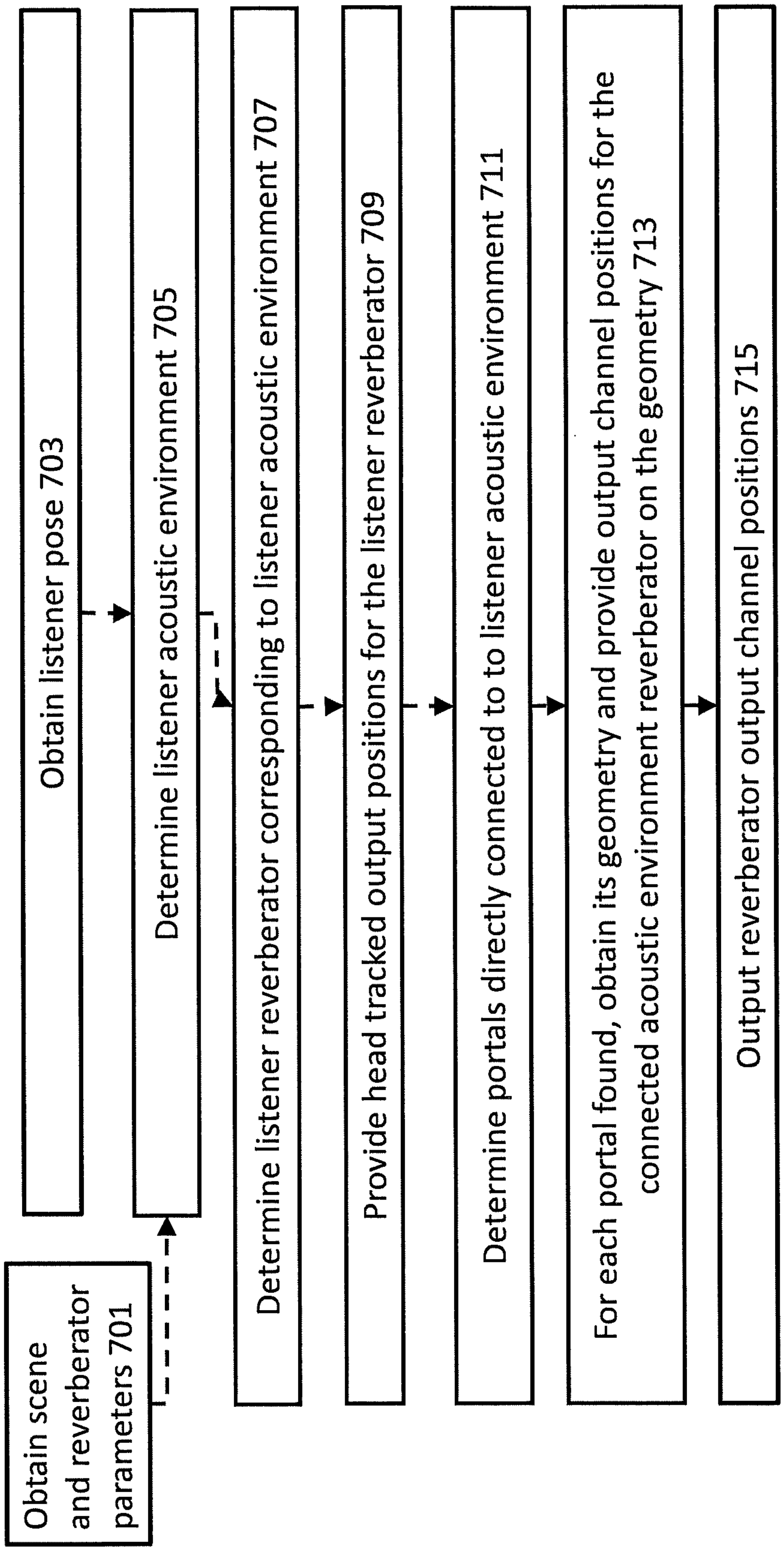
FIG. 7 shows a flow diagram of the operation of the example reverberator output signals spatializer controller as shown in FIG. 3 in further detail according to some embodiments.

With respect to FIG. 7 is shown a flow diagram of the operation of the reverberated signal spatialization controller 309 as shown in FIG. 3 in further detail according to some embodiments. As described above the output of the reverberators corresponding to the acoustic environment where the user currently is, is rendered by the reverberator output signals spatializer 307 as an immersive audio signal surrounding the user. That is, the signals in $s_{rev,r}(j, t)$ corresponding to the listener environment are rendered as point sources surrounding the listener. It is noted that DPV gains or additional delays do not need to be applied to those signals. As such the reverberator output signals spatialization controller is configured to obtain and use the listener pose and scene and reverberation parameters to determine the acoustic environment where the listener currently is and provide that reverberator output channel positions surrounding the listener. This means that the reverberation when inside an acoustic enclosure, caused by that acoustic enclosure, is rendered as a diffuse signal enveloping the listener.

Thus is shown the operations of obtaining scene and reverberator parameters as shown by FIG. 7 by 701, the obtaining of the listener pose as shown by FIG. 7 by 703. Then is shown the determining of the listener acoustic environment as shown in FIG. 7 by 705.

Following this is the determination of a listener reverberator corresponding to listener acoustic environment as shown in FIG. 7 by 707.

Then is the provision of head tracked output positions for the listener reverberator 709.

The determination of portals directly connected to the listener acoustic environment is shown in FIG. 7 by 711.

For each portal found, obtain its geometry and provide output channel positions for the connected acoustic environment reverberator on the geometry shown in FIG. 7 by 713.

Then output the determined reverberator output channel positions as shown in FIG. 7 by 715.

A neighbor acoustic environment can be audible in the current environment via the directional portal output. The reverberator output signals spatialization controller is thus configured to employ the portal position information carried in the scene parameters to provide in the reverberator output channel positions suitable positions for the reverberator outputs which correspond to portals. To obtain a spatially extended perception of the portal sound, the output channels corresponding to reverberators which are to be rendered at a portal are provided positions along portal geometry which divides two acoustic spaces, such as $AC_1$ 207 depicted in FIG. 2. The Reverberator controller can provide the active portal connection information to Reverberation output signal spatialization controller, and the currently active portals for the listener acoustic environment can be determined based on this.

Figure 8:
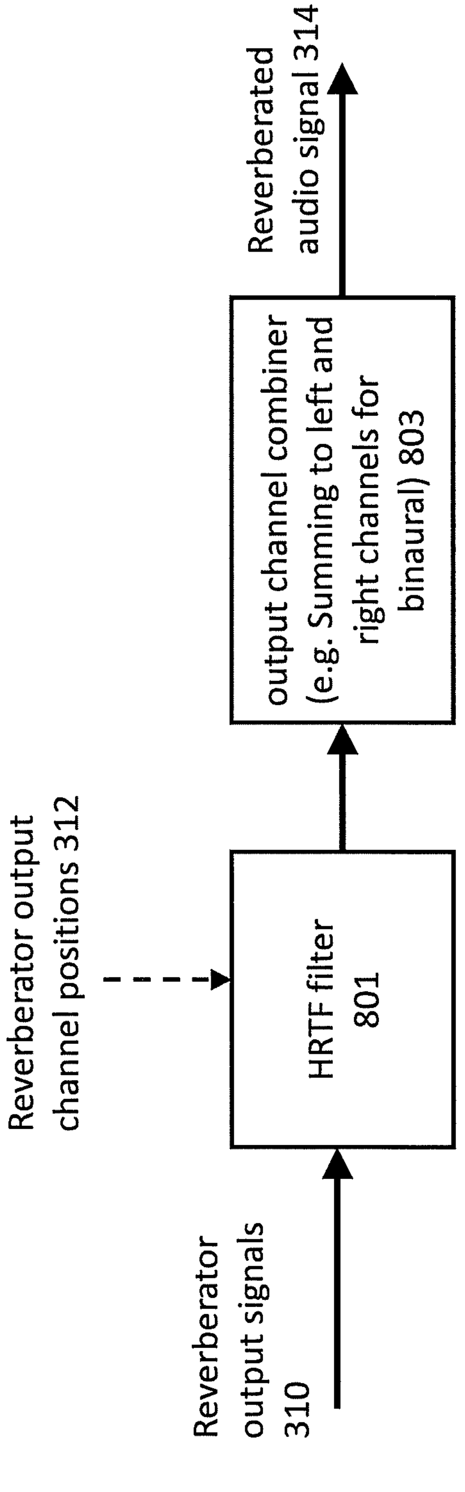
FIG. 8 shows schematically an example reverberator output signals spatializer as shown in FIG. 3 in further detail according to some embodiments.

FIG. 8 shows a schematic view of an example reverberator output signals spatializer 307. The reverberator output signals spatializer 307 is configured to receive the reverberator output channel positions 312 from the reverberator output signals spatialization controller 309. The reverberator output signals spatializer 307 is configured to render each reverberator output into a desired output format such as binaural and then sum the signals to produce the output reverberated audio signal 314. For a binaural reproduction the reverberator output signals spatializer 307 can comprise a HRTF filter 801 configured to receive the reverberator output channel positions 312 and the reverberator output signals 310 and render the reverberator output signals in their desired positions indicated by reverberator output channel positions.

Then the reverberator output signals spatializer 307 comprises an output channel combiner 803 which combines the channels and generates the reverberated audio signal 314.

FIG. 9 illustrates a typical reverberators implemented as a FDN reverberator (and $GEQ_{ratio}$ filter).

In some embodiments the FDN reverberator 305 comprises an energy ratio control filter $GEQ_{ratio}$ 953 which is configured to receive the input.

The example FDN reverberator 305 is configured such that the reverberation parameters are processed to generate coefficients $GEQ_d$ ($GEQ_1$, $GEQ_2$, . . . $GEQ_D$) of the attenuation filters 961, feedback matrix 957 coefficients A, lengths $m_d$ ($m_1$, $m_2$, . . . $m_D$) for D delay lines 959 and energy ratio control filter 953 coefficients $GEQ_{ratio}$. The energy ratio control filter 953 can also be referred as RDR energy ratio control filter or reverberation ratio control filter or reverberation equalization or coloration filter. The purpose of such a filter is to adjust the level and spectrum according to the RDR or DSR or other reverberation ratio data.

In some embodiments the attenuation filter $GEQ_d$ 961 is implemented as a graphic EQ filter using M biquad IIR band filters. With octave bands M=10, thus, the parameters of the graphic EQ comprise the feedforward and feedback coefficients for biquad IIR filters, the gains for biquad band filters, and the overall gain.

The reverberator uses a network of delays 959, feedback elements (shown as attenuation filters 961, feedback matrix 957 and combiners 955 and output gain 963) to generate a very dense impulse response for the late part. Input samples are input to the reverberator to produce the reverberation audio signal component which can then be output.

The FDN reverberator comprises multiple recirculating delay lines. The unitary matrix A 957 is used to control the recirculation in the network. Attenuation filters 961 which may be implemented in some embodiments as graphic EQ filters implemented as cascades of second-order-section IIR filters can facilitate controlling the energy decay rate at different frequencies. The filters 961 are designed such that they attenuate the desired amount in decibels at the pulse pass through the delay line and such that the desired RT60 time is obtained.

With octave bands M=10, thus, the parameters of the graphic EQ comprise the feedforward b and feedback a coefficients for 10 biquad IIR filters, the gains for biquad band filters, and the overall gain.

The number of delay lines D can be adjusted depending on quality requirements and the desired tradeoff between reverberation quality and computational complexity. In an embodiment, an efficient implementation with D=15 delay lines is used. This makes it possible to define the feedback matrix coefficients A as proposed by Rocchesso in Maximally Diffusive Yet Efficient Feedback Delay Networks for Artificial Reverberation, IEEE Signal Processing Letters, Vol. 4. No. 9, September 1997, in terms of a Galois sequence facilitating efficient implementation.

Figure 10:
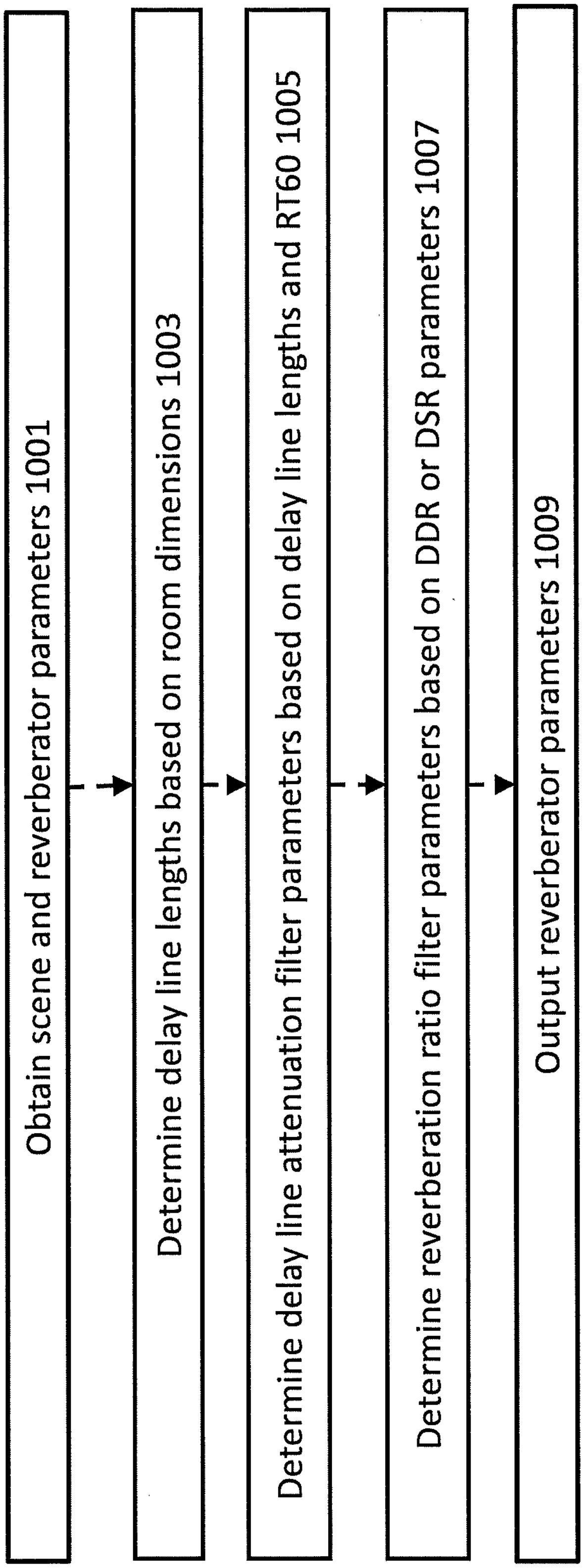
FIG. 10 shows a flow diagram of the operation of the example reverberator configurator as shown in FIG. 3 in further detail according to some embodiments.

With respect to FIG. 10 is shown a flow diagram of the example reverberator configurator 303 as shown in FIG. 3.

The first operation is one of obtaining scene and reverberator parameters as shown in FIG. 10 by 1001.

Then is shown determining delay line lengths based on room dimensions as shown in FIG. 10 by 1003.

Following this is determining delay line attenuation filter parameters based on delay line lengths and RT60 as shown in FIG. 10 by 1005.

This can be followed by determining reverberation ratio filter parameters based on RDR or DSR parameters as shown in FIG. 10 by 1007.

Then is the output of the reverberator parameters as shown in FIG. 10 by 1009.

Figure 11:
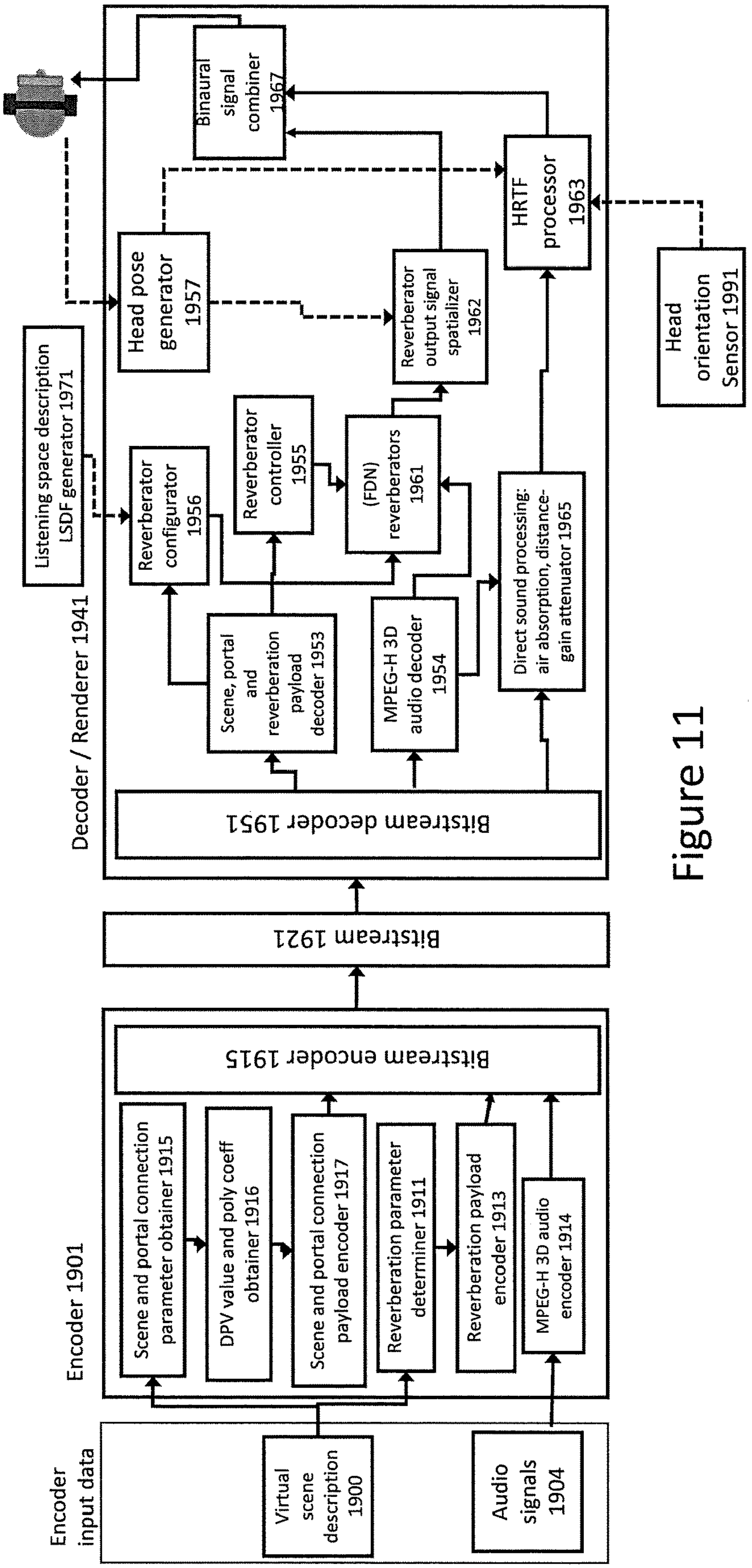
FIG. 11 shows schematically an example apparatus with transmission and/or storage within which some embodiments can be implemented.

With respect to FIG. 11 is shown schematically an example system where the embodiments are implemented by an encoder 1901 which writes data into a bitstream 1921 and transmits that for a decoder/renderer 1941, which decodes the bitstream, performs reverberator processing according to the embodiments and outputs audio for headphone listening.

FIG. 11 therefore shows apparatus, and specifically the renderer device 1941, which is suitable for performing spatial rendering operations.

The encoder or server 1901 in some embodiments can be performed on content creator computers and/or network server computers. The encoder 1901 can generate the bitstream 1921 which is made available for downloading or streaming (or storing). The decoder/renderer 1941 which may be implemented as a playback device and which can be a mobile device, personal computer, sound bar, tablet computer, car media system, home HiFi or theatre system, head mounted display for AR or VR, smart watch, or any suitable system for audio consumption.

The encoder 1901 is configured to receive the virtual scene description 1900 and the audio signals 1904. The virtual scene description 1900 can be provided in the MPEG-1 Encoder Input Format (EIF) or in other suitable format. Generally, the virtual scene description contains an acoustically relevant description of the contents of the virtual scene, and contains, for example, the scene geometry as a mesh or voxel, acoustic materials, acoustic environments with reverberation parameters, positions of sound sources, and other audio element related parameters such as whether reverberation is to be rendered for an audio element or not.

In some embodiments the encoder 1901 comprises a scene and portal connection parameter obtainer 1915 configured to obtain the virtual scene description and portal parameters.

The encoder 1901 further comprises a DPV value and polynomial coefficient obtainer 1916. The obtainer 1916 can be configured to derive the direct propagation value (DPV) for each AE and each portal opening. For the derivation the encoder uses the obtained portal geometry from portal geometry processing, or from input from the content creator. Portal geometry contains the mesh or other geometric representation describing the portal opening geometry.

The processing is as follows:

For each AE 1201 and for each portal 1203 within the AE 1201

Obtain the portal opening face 1205 having the same orientation as the wall of the AE where the portal is 1207 and which is closest to the center of the AE;

For each possible sound source position 1209:

- Aim four rays 1211, 1213, 1215, and 1217 from the object source position 1209 towards the vertices of the portal opening face 1219, 1221, 1223, and 1225;
- Determine points 1227, 1229, 1231, and 1233 1 m from the source position 1209 along these rays 1211, 1213, 1215, and 1217;
- Determine the face 1235 formed by these points;
- Calculate the area of the face 1235;
- Calculate the ratio of the face area to the area of a sphere (4*pi) of 1 m radius to obtain DPV;

It is noted that the area ratio is an approximation since the formed face 1235 is rectangular and is not taking the spherical shape into account. In some embodiments, the modelling approximation error of calculating the rectangular surface area while neglecting the curvature of the surface is compensated by adding a suitable multiplier to compensate for the error. Such multiplier can be a constant that is applied to the calculated area of the face 1235 which will increase the area as if it was curved rather than rectangular and flat.

The DPV can depend on the position of the source within the AE and with respect to the opening. Polynomial modelling can be used to model a smoothly varying DPV value within a range of x, y positions in the space. Thus, the polynomial is used to model the place-dependent value of the DPV within the AE. Note that equivalently the coordinates can be x, z if the openGL coordinate system is used, in which the x, and z define the horizontal plane and y is the vertical axis.

For example, second or third order polynomial in two dimensions having the form $f(x,y)=a_0+a_1x+a_2x^2+a_3x^3+b_0+b_1y+b_2y^2+b_3y^3$ can be used. The fit of the polynomial to the calculated DPV data at positions x and y can be implemented, for example, using a least squares fit. The fit can be done for a second order polynomial and third order polynomial and the one giving a better fit to the data can be selected. In other embodiments higher order polynomials can be used.

Figure 13:
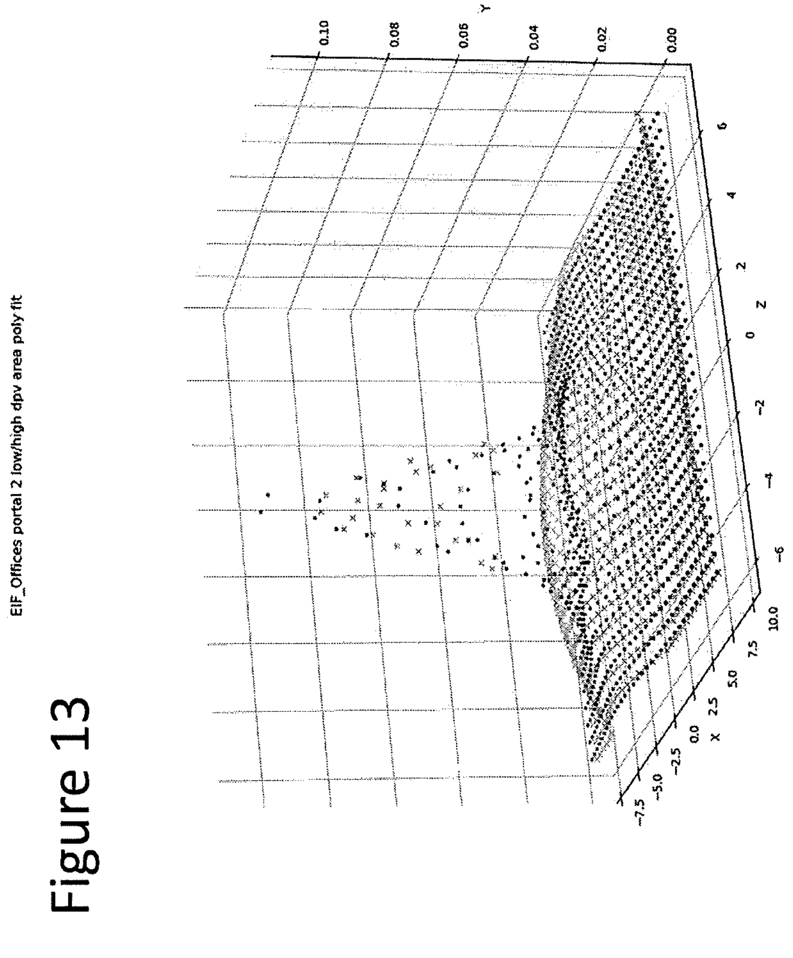
FIG. 13 shows schematically modelling of a place dependent DVP value with a polynomial in two dimensions.

FIG. 13 furthermore shows an example of modelling the place dependent DPV value with a polynomial in two dimensions. The modelling can be performed in different regions of the space such that whenever there is a peak in the DPV value then that peak surrounded with a first region is modeled with a first set of polynomial coefficients. The surrounding region can be modelled with a second set of polynomial coefficients.

Polynomial coefficients are carried in the bitstream. The polynomial coefficients are associated with a region of validity.

Figure 12:
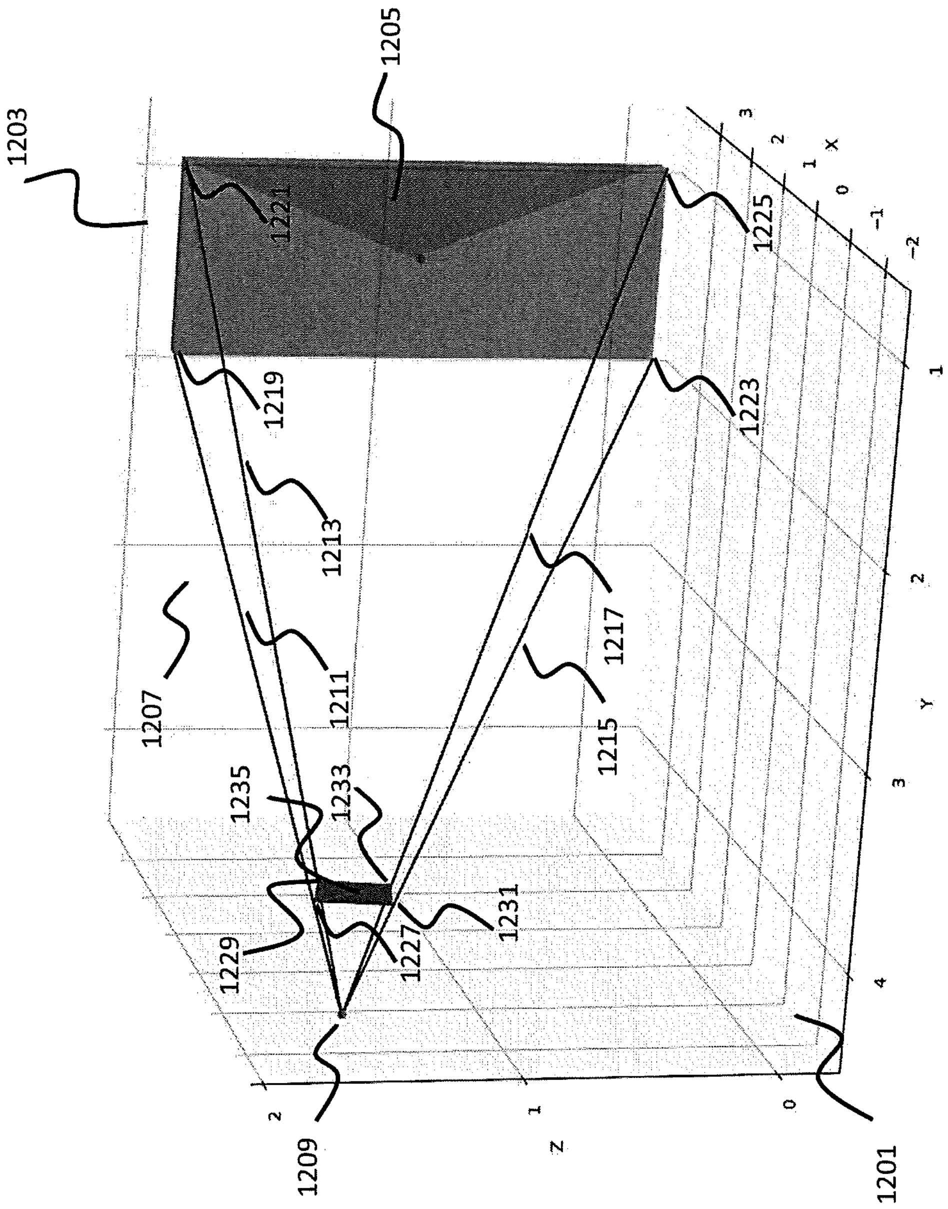
FIG. 12 shows schematically an example derivation of the DVP value for a portal.

In some embodiments the selection of polynomial modeling regions is done by analyzing the error of the polynomial modeling. That is, the error of DPV values in positions DPV(x, y) calculated using the method of FIG. 12 are compared to the values obtained when calculated based on a polynomial f(x, y) fit to values x, y. When performing modeling over a first region if the error crosses a predetermined threshold then it can be determined that a second polynomial modeling is required on an area where the error exceeds a threshold. The surrounding area can be modeled with a second set of coefficients. In some other embodiments there can be a fixed threshold on the DPV value which will cause a second polynomial to be fit to a region where the DPV value exceeds a predetermined threshold.

The bitstream syntax and semantics that can be used to transmit information from an encoder device on the example embodiment where polynomial coefficients are used to represent the DPV data are presented as follows:

Bit stream syntax and semantics descriptions:

| Syntax | No. of bits | Mnemonic |
|---|---|---|
| revNumUniquePortals = getCountOrIndex( ) | var | vlclbf |
| for (i = 0:revNumUniquePortals−1) | | |
| { | | |
| portalConnectsTwoSpaces | 1 | boolean |
| portalOpeningPositionX | 16 | float |
| portalOpeningPositionY | 16 | float |
| portalOpeningPositionZ | 16 | float |
| portalConnectedSpace1BsId = getID( ) | var | vlclbf |
| if(portalConnectsTwoSpaces) | | |
| portalConnectedSpace2BsId = getID( ) | var | vlclbf |
| revNumPolynomialAreas = getCountOrIndex( ) | var | vlclbf |
| for (j = 0:revNumPolynomialAreas − 1) | | |
| { | | |
| revNumPolynomialAreaVertices = getCountOrIndex( ) | var | vlclbf |
| for (k = 0:revNumPolynomialAreaVertices − 1) | | |
| { | | |
| polynomialAreaVertexPosX[k][0] | 16 | float |
| polynomialAreaVertexPosY[k][1] | 16 | float |
| polynomialAreaVertexPosZ[k][2] | 16 | float |
| } | | |
| polynomialAreaNumCoeffs = getCountOrIndex( ) | var | vlclbf |
| for (k = 0:polynomialAreaNumCoeffs − 1) | | |
| { | 32 | float |
| polynomialAreaCoefficient[k] | | |
| } | | |
| } | | |
| } | | |

Semantics:
revNumUniquePortals → number of portals in the scene
portalOpeningPositionX → x element of the portal opening center position in x,y,z space
portalOpeningPositionY → y element of the portal opening center position in x,y,z space
portalOpeningPositionZ → z element of the portal opening center position in x,y,z space
(In some embodiments the variables portalOpeningPositionX, portalOpeningPositionY, and portalOpeningPositionZ can be renamed to portalCentrePositionX, portalCentrePositionY, and portalCentrePositionZ).
portalConnectedSpace1BsId → bitstream identifier of the first space portal connects portalConnectedSpace2BsId → bitstream identifier of the second space portal connects
(in some embodiments there can be included the following variables portalInnermostFaceCentroidX, portalInnermostFaceCentroidY, portalInnermostFaceCentroidZ,
which are introduced in the AE specific polynomial approach.)

-continued

| Bit stream syntax and semantics descriptions: |
|---|
| revNumPolynomialAreas → number of polynomial areas for the portal<br>revNumPolynomialAreaVertices → number of vertices the polynomial area consists of<br>polynomialAreaVertexPosX → x element of the polynomial area vertex<br>polynomialAreaVertexPosY → y element of the polynomial area vertex<br>polynomialAreaVertexPoxZ → z element of the polynomial area vertex<br>polynomialAreaNumCoeffs → number of polynomial coefficients<br>polynomialAreaCoefficient → value of the polynomial area coefficient<br>portalConnectsTwoSpaces Is true if the portal connects two acoustic environments. |

The revNumUniquePortals lists the number of portals in the audio scene. Each unique portal typically has two acoustic environment(s) associated with the portal opening. Depending on the audio source (object, channel, HOA signal type) position, the correct unique portal is selected. Subsequently, the polynomial corresponding to the audio source position is selected evaluate the contribution of the audio source to the diffuse late reverberation rendering in the acoustic environment where its contribution is calculated to.

In some embodiments there can be a number of elevation levels defined for each of the polynomials. In this case the bitstream syntax above will have a variable referred as revNumAreaElevations which will indicate the number of elevation levels used. Each elevation level will have its polynomial coefficients, and the renderer will then select the coefficients having the elevation level closest to the current sound source elevation. The number of elevation levels can have an explicit height specified or in other cases, the levels divide the height of the audio scene into equal number of parts.

In some embodiments the polynomial order (e.g., whether it is a second or third order polynomial) can be explicitly carried in the bitstream, e.g., as a variable polynomialAreaEquationOrder.

It is noted that if the model has a different form than a polynomial then the parameters will also be different. The model could be an alternative way of creating or modelling a surface which represents the DPV data over a certain region. Examples include the weights, means, and covariances of a Gaussian mixture model or the weights of a neural network. In some embodiments the model can be a simple linear model in one or more dimensions. Such a simple linear model in one dimension can have just one parameter.

The following mnemonics are defined to describe the different data types used in the coded bitstream payload.

bslbf Bit string, left bit first, where "left" is the order in which bit strings are written in ISO/IEC 14496 (all parts). Bit strings are written as a string of 1s and 0s within single quote marks, for example '1000 0001'. Blanks within a bit string are for ease of reading and have no significance.

uimsbf Unsigned integer, most significant bit first.

vlclbf Variable length code, left bit first, where "left" refers to the order in which the variable length codes are written.

tcimsbf Two's complement integer, most significant (sign) bit first.

cstring A C style string; a sequence of ascii characters, in bytes, terminated with a null byte (0x00).

float An IEEE 754 floating single point precision number.

In some embodiments a complementary or alternative syntax can be used to carry the explicit DPV values for sound source positions. In the below syntax, there are revNumObjectSources object sources, each having a bitstream identifier objSrcBsId, which get a DPV value represented as directPropagationValue with respect to portal openings identified with portalIdx

| | | |
|---|---|---|
| revNumObjectSources = getCountOrIndex( ) | var | vlclbf |
| for (i = 0:revNumObjectSources − 1) | | |
| { | | |
| objSrcBsId = getID( ) | var | vlclbf |
| spaceBsId = getID( ) | var | vlclbf |
| revNumObjsrcPortalOpenings = getCountOrIndex( ) | var | vlclbf |
| for (j = 0: revNumObjsrcPortalOpenings − 1) | | |
| { | | |
| portalIdx = getCountOrIndex( ) | var | vlclbf |
| directPropagationValue[j] | 16 | float |
| openingConnectionBsId = getID( ) | var | vlclbf |
| } | | |
| } | | |

Semantics:
revNumObjectSources → number of object sources in the scene
objSrcBsId →bitstream identifier of the object source
spaceBsId → bitsream identifier of the space object source is in
revNumObjsrcPortalOpenings → number of portal openings in iterated space
portalIdx → index identifier for the portal
directPropagationValue → DPV value for the portal of openingIdx
openingConnectionBsId → bitstream identifier of the space where the portal connects to In some embodiments the above syntax can be used for a subset of the most important sound sources of the scene. Such important sound sources can be e.g. the static sound sources in the scene (i.e., sources which do not move) or sources which are otherwise determined or marked to be important. In some embodiments explicit DPV value data can be carried for important regions of the scene or regions in the scene where the modelled values do not result in accurate enough modelling of the calculated DPV data.

Furthermore the encoder 1901 can comprise a scene and portal connection payload encoder 1917 which is configured to encode the scene and portal connection payload and the DPV values and/or polynomial coefficients.

Furthermore the encoder 1901 can comprise in some embodiments a reverberation parameter obtainer 1911 which is configured to obtain the virtual scene description 1900 and generate or obtain suitable reverberation parameters.

Furthermore, in some embodiments, the encoder 1901 comprises a reverberation payload encoder 1913 configured to obtain the determined or obtained reverberation parameters and generate a suitable encoded payload.

The encoder 1901 further comprises a MPEG-H 3D audio encoder 1914 configured to obtain the audio signals 1904 and MPEG-H encode them and pass them to a bitstream encoder 1915.

The encoder 1901 furthermore in some embodiments comprises a bitstream encoder 1921 which is configured to receive the output of the reverberation payload encoder 1913 and the encoded audio signals from the MPEG-H encoder 1914 and the scene and portal connection payload encoder 1917 and generate the bitstream 1921 which can be passed to the bitstream decoder 1951. The bitstream 1921 in some embodiments can be streamed to end-user devices or made available for download or stored.

The decoder/renderer 1941 in some embodiments is configured to receive or otherwise obtain the bitstream 1921, and furthermore can be configured to receive or otherwise obtain the listening space description from a listening space description generator 1971 (which can in some embodiments be in a listening space description format—LSDF), which defines the acoustic properties of the listening space within which the user or listener is operating in. Additionally in some embodiments the playback device is configured to obtain, for example from the head mounted device (HMD), listener orientation or position information. These can for example be generated by sensors within the HMD or from sensors in the environment sensing the orientation or position of the listener.

In some embodiments the decoder/renderer 1941 comprises a bitstream decoder 1951 which is configured to regenerate the scene, portal and reverberation information and pass it to a scene, portal and reverberation payload decoder 1953, and obtain MPEG-H 3D audio packets which are passed to the MPEG-H 3D audio decoder 1954, and audio element parameters such as sound sources positions for direct sound processing.

The decoder/renderer 1941 further can comprise a scene, portal and reverberation payload decoder 1953 configured to obtain the encoded scene, portal and reverberation parameters and decode these in an opposite or inverse operation to the reverberation payload encoder 1913 and scene and portal connection payload encoder 1917.

In some embodiments the decoder/renderer 1941 comprises a head pose generator 1957 which is configured to receive information from a head mounted device or similar and generates head pose information or parameters which can be passed to the reverberator output signal spatializer 1962 and HRTF processor 641

The decoder/renderer 1941, in some embodiments, comprises a reverberator controller 1955 and configurator 1956 which is configured to obtain the determined scene, portal and reverberation parameters and generate the parameters which can be passed to the (FDN) reverberators 1961 in a manner as described earlier.

The decoder/renderer 1941 in some embodiments comprises a MPEG-H 3D audio decoder 1954 which is configured to decode the audio signals and pass them to the (FDN) reverberator 1911 and direct sound processor 1965.

The decoder/renderer 1941 furthermore comprises the (FDN) reverberator 1961 initialized by the reverberator controller 1955 and reverberator configurator 1956 and configured to implement a suitable reverberation of the audio signals.

The output of the (FDN) reverberator 1955 is configured to output to a reverberator output signals spatializer 1962.

Additionally the decoder/renderer 1941 comprises a direct sound processor 1965 which is configured to receive the decoded audio signals and configured to implement any direct sound processing such as air absorption and distance-gain attenuation and which can be passed to a HRTF processor 1963.

The HRTF processor 1963 can be configured to receive the output of the direct sound processor 1965 and generate processed audio signals associated with the processed direct audio components to the binaural signal combiner 1967.

The binaural signal combiner 1967 is configured to combine the direct and reverberant parts to generate a suitable output (for example for headphone reproduction).

The output can be passed to the head mounted device.

The playback device can be implemented in different form factors depending on the application. In some embodiments the playback device is equipped with its own listener position tracking apparatus or receives the listener position information from an external apparatus. The playback device can in some embodiments be also equipped with headphone connector to deliver output of the rendered binaural audio to the headphones.

Figure 14:
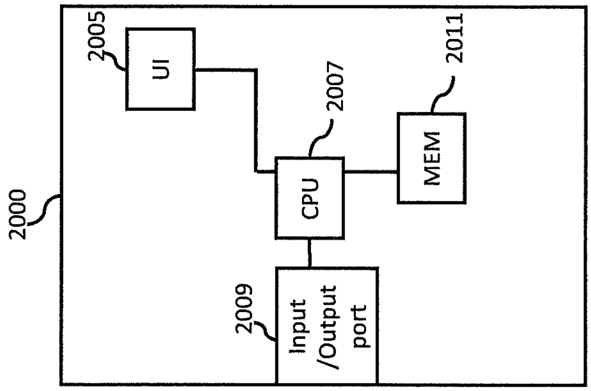
FIG. 14 shows an example device suitable for implementing the apparatus shown in previous figures.

With respect to FIG. 14 an example electronic device which may be used as any of the apparatus parts of the system as described above. The device may be any suitable electronics device or apparatus. For example in some embodiments the device 2000 is a mobile device, user equipment, tablet computer, computer, audio playback apparatus, etc. The device may for example be configured to implement the encoder or the renderer or any functional block as described above.

In some embodiments the device 2000 comprises at least one processor or central processing unit 2007. The processor 2007 can be configured to execute various program codes such as the methods such as described herein.

In some embodiments the device 2000 comprises a memory 2011. In some embodiments the at least one processor 2007 is coupled to the memory 2011. The memory 2011 can be any suitable storage means. In some embodiments the memory 2011 comprises a program code section for storing program codes implementable upon the processor 2007. Furthermore in some embodiments the memory 2011 can further comprise a stored data section for storing data, for example data that has been processed or to be processed in accordance with the embodiments as described herein. The implemented program code stored within the program code section and the data stored within the stored data section can be retrieved by the processor 2007 whenever needed via the memory-processor coupling.

In some embodiments the device 2000 comprises a user interface 2005. The user interface 2005 can be coupled in some embodiments to the processor 2007. In some embodiments the processor 2007 can control the operation of the user interface 2005 and receive inputs from the user interface 2005. In some embodiments the user interface 2005 can enable a user to input commands to the device 2000, for example via a keypad. In some embodiments the user interface 2005 can enable the user to obtain information from the device 2000. For example the user interface 2005 may comprise a display configured to display information from the device 2000 to the user. The user interface 2005 can in some embodiments comprise a touch screen or touch interface capable of both enabling information to be entered to the device 2000 and further displaying information to the user of the device 2000. In some embodiments the user interface 2005 may be the user interface for communicating.

In some embodiments the device 2000 comprises an input/output port 2009. The input/output port 2009 in some embodiments comprises a transceiver. The transceiver in such embodiments can be coupled to the processor 2007 and configured to enable a communication with other apparatus or electronic devices, for example via a wireless communications network. The transceiver or any suitable transceiver or transmitter and/or receiver means can in some embodiments be configured to communicate with other electronic devices or apparatus via a wire or wired coupling.

The transceiver can communicate with further apparatus by any suitable known communications protocol. For example in some embodiments the transceiver can use a suitable universal mobile telecommunications system (UMTS) protocol, a wireless local area network (WLAN) protocol such as for example IEEE 802.X, a suitable short-range radio frequency communication protocol such as Bluetooth, or infrared data communication pathway (IRDA).

The input/output port 2009 may be configured to receive the signals.

In some embodiments the device 2000 may be employed as at least part of the renderer. The input/output port 2009 may be coupled to headphones (which may be a headtracked or a non-tracked headphones) or similar.

Thus in summary the embodiments as described above show:

A normative bitstream comprising:

Information specifying the triggers and the guidance parameters for dynamically modifying the reverb pre-delay parameter;

a bitstream description the parameters for which the renderer is expected to react (e.g., lower order early reflections, complexity or network bottleneck, etc.) and modifying the reverberation rendering dynamically based on the triggers.

Additionally in some embodiments the normative bitstream comprises trigger and predelay modification parameters described using the syntax described herein. The bitstream in some embodiments is streamed to end-user devices or made available for download or stored.

In some embodiments the normative renderer is configured to decode the bitstream to obtain the scene, reverberation parameters and dynamic reverb adjustment parameters and perform the modification to reverberator parameters as described herein. Moreover in some embodiments the renderer is configured to implement reverberation and early reflections rendering.

In some embodiments the complete normative renderer can also obtain other parameters from the bitstream related to room acoustics and sound source properties, and use them to render the direct sound, diffraction, sound source spatial extent or width, and other acoustic effects in addition to diffuse late reverberation and early reflections.

Thus in summary the concept is on in which there is the capacity for dynamic modification of rendering of reverberation based on the various triggers specified in the bitstream to enable bitrate and computational scalability based on suboptimal early reflections or other missing acoustic effects.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general-purpose computers, special purpose computers, microprocessors, digital signal processors (DSPs), application specific integrated circuits (ASIC), gate level circuits and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, California and Cadence Design, of San Jose, California automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and I hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The term "non-transitory," as used herein, is a limitation of the medium itself (i.e., tangible, not a signal) as opposed to a limitation on data storage persistency (e.g., RAM vs. ROM).

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention as defined in the appended claims.

The invention claimed is:

1. A method for generating reverberant audio signals, the method comprising:

obtaining at least one reverberation parameter associated with a first acoustic environment;

obtaining at least one audio source located in at least one position outside of the first acoustic environment, the at least one audio source having an associated audio signal;

generating at least one source contribution parameter for the at least one position of the at least one audio source, related to energy contribution for the at least one audio source through at least one acoustic portal, wherein the at least one source contribution parameter is generated based, at least partially, on information associated with the at least one acoustic portal; and generating a reverberated audio signal associated with the at least one audio source based on the at least one source contribution parameter to adjust a level of the associated audio signal.

2. The method as claimed in claim 1, wherein the first acoustic environment comprises at least one finite defined dimension range and at least one acoustic portal associated with the at least one finite defined dimension range.

3. The method as claimed in claim 2, wherein generating the at least one source contribution parameter for the at least one position of the at least one audio source comprises:

obtaining at least one model parameter associated with the at least one position of the at least one audio source; and generating the at least one source contribution parameter based on the at least one model parameter, the at least one source contribution parameter related to the energy contribution for the at least one audio source from the at least one position to the first acoustic environment.

4. The method as claimed in claim 3, wherein the at least one source contribution parameter is related to the energy contribution for the at least one audio source from the at least one position to the first acoustic environment through the at least one acoustic portal.

5. The method as claimed in claim 1, further comprising generating at least one delay parameter related to a propagation delay for the at least one audio source from the at least one position to the first acoustic environment, wherein generating the reverberated audio signal associated with the at least one audio source is further based on the at least one delay parameter applied to delay the associated audio signal.

6. The method as claimed in claim 3, wherein obtaining the at least one model parameter comprises obtaining a polynomial in at least two dimensions, and generating the at least one source contribution parameter based on the at least one model parameter comprises generating a direct propagation value representing transmission of energy from the at least one audio source through the at least one acoustic portal.

7. The method as claimed in claim 6, wherein generating the direct propagation value representing transmission of the energy from the at least one audio source through the at least one acoustic portal comprises evaluating the polynomial in the at least two dimensions at a position for the at least one audio source to be rendered.

8. The method as claimed in claim 1, further comprising obtaining a flag or indicator configured to identify whether the at least one audio source is a static or dynamic audio source, wherein generating the at least one source contribution parameter comprises recalculating the generation of the at least one source contribution parameter at determined update times for an identified dynamic audio source.

9. The method as claimed in claim 1, wherein generating the reverberated audio signal associated with the at least one audio source based on the at least one source contribution parameter to adjust the level of the associated audio signal further comprises applying a directivity filter based on an orientation of the at least one audio source, wherein the reverberated audio signal is generated further based on the at least one reverberation parameter associated with the first acoustic environment.

10. The method as claimed in claim 1, wherein the at least one position outside of the first acoustic environment is a center of a spatial extent of the at least one audio source.

11. The method as claimed in claim 1, wherein the at least one position outside of the first acoustic environment is at least two positions within a spatial extent of the at least one audio source, wherein generating the at least one source contribution parameter comprises generating a weighted average of source contribution parameters associated with the at least two positions of the at least one audio source.

12. An apparatus for assisting generating reverberant audio signals, the apparatus comprising:

at least one processor; and at least one memory storing instructions that, when executed with the at least one processor, cause the apparatus at least to perform:

obtaining at least one reverberation parameter associated with a first acoustic environment;

obtaining at least one audio source located in at least one position outside of the first acoustic environment, the at least one audio source having an associated audio signal;

generating at least one source contribution parameter for the at least one position of the at least one audio source, related to energy contribution for the at least one audio source through at least one acoustic portal, wherein the at least one source contribution parameter is generated based, at least partially, on information associated with the at least one acoustic portal; and generating a reverberated audio signal associated with the at least one audio source based on the at least one source contribution parameter to adjust a level of the associated audio signal.

13. The apparatus as claimed in claim 12, wherein the first acoustic environment comprises at least one finite defined dimension range and at least one acoustic portal associated with the at least one finite defined dimension range.

14. The apparatus as claimed in claim 13, wherein the instructions, when executed with the at least one processor, cause the apparatus to perform:

obtaining at least one model parameter associated with the at least one position of the at least one audio source; and generating the at least one source contribution parameter based on the at least one model parameter, the at least one source contribution parameter related to the energy contribution for the at least one audio source from the at least one position to the first acoustic environment.

15. The apparatus as claimed in claim 14, wherein the at least one source contribution parameter is related to the energy contribution for the at least one audio source from the at least one position to the first acoustic environment through the at least one acoustic portal.

16. The apparatus as claimed in claim 12, wherein the instructions, when executed with the at least one processor, cause the apparatus to perform generating at least one delay parameter related to a propagation delay for the at least one audio source from the at least one position to the first acoustic environment, and wherein the instructions, when executed with the at least one processor, further cause the apparatus to perform generating the reverberated audio signal based on the at least one delay parameter applied to delay the associated audio signal.

17. The apparatus as claimed in claim 14, wherein instructions, when executed with the at least one processor, cause the apparatus to perform obtaining a polynomial in at least two dimensions, and wherein the instructions, when executed with the at least one processor, further cause the apparatus to perform generating a direct propagation value representing transmission of energy from the at least one audio source through the at least one acoustic portal.

18. The apparatus as claimed in claim 17, wherein the instructions, when executed with the at least one processor, cause the apparatus to perform evaluating the polynomial in the at least two dimensions at a position for the at least one audio source to be rendered.

19. The apparatus as claimed in claim 12, wherein the instructions, when executed with the at least one processor, cause the apparatus to obtain a flag or indicator configured to identify whether the at least one audio source is a static or dynamic audio source, and wherein the instructions, when executed with the at least one processor, cause the apparatus to perform recalculating the generation of the at least one source contribution parameter at determined update times for an identified dynamic audio source.

20. The apparatus as claimed in claim 12, wherein the instructions, when executed with the at least one processor, cause the apparatus to perform applying a directivity filter based on an orientation of the at least one audio source.

21. The apparatus as claimed in claim 12, wherein the at least one position outside of the first acoustic environment is a center of a spatial extent of the at least one audio source.

22. A non-transitory computer-readable medium comprising program instructions stored thereon for performing at least the following:

causing obtaining of at least one reverberation parameter associated with a first acoustic environment;

causing obtaining of at least one audio source located in at least one position outside of the first acoustic environment, the at least one audio source having an associated audio signal;

causing generating at least one source of contribution parameter for the at least one position of the at least one audio source, related to energy contribution for the at least one audio source through at least one acoustic portal, wherein the at least one source contribution parameter is generated based, at least partially, on information associated with the at least one acoustic portal; and causing generating of a reverberated audio signal associated with the at least one audio source based on the at least one source contribution parameter to adjust a level of the associated audio signal.

* * * * *